United States Patent
Miyazaki et al.

(10) Patent No.: US 9,182,639 B2
(45) Date of Patent: Nov. 10, 2015

(54) LIQUID CRYSTAL DISPLAY DEVICE

(75) Inventors: Kayoko Miyazaki, Isesaki (JP); Keiji Tago, Kumagaya (JP)

(73) Assignee: JAPAN DISPLAY INC., Tokyo (JP)

( * ) Notice: Subject to any disclaimer, the term of this patent is extended or adjusted under 35 U.S.C. 154(b) by 345 days.

(21) Appl. No.: 13/614,401

(22) Filed: Sep. 13, 2012

(65) Prior Publication Data

US 2013/0077028 A1    Mar. 28, 2013

(30) Foreign Application Priority Data

Sep. 28, 2011 (JP) .................. 2011-212610

(51) Int. Cl.
*G02F 1/1335* (2006.01)
*G02F 1/1343* (2006.01)

(52) U.S. Cl.
CPC ................. *G02F 1/134363* (2013.01)

(58) Field of Classification Search
None
See application file for complete search history.

(56) References Cited

U.S. PATENT DOCUMENTS

| 6,266,116 | B1 | 7/2001 | Ohta et al. | |
|---|---|---|---|---|
| 2001/0010575 | A1 | 8/2001 | Yoshida et al. | |
| 2002/0171779 | A1* | 11/2002 | Kimura et al. | 349/39 |
| 2004/0165136 | A1 | 8/2004 | Sugiyama et al. | |
| 2005/0206824 | A1* | 9/2005 | Son et al. | 349/141 |
| 2005/0219453 | A1 | 10/2005 | Kubo et al. | |
| 2007/0115234 | A1 | 5/2007 | Kim et al. | |
| 2007/0236630 | A1 | 10/2007 | Tago et al. | |
| 2008/0062358 | A1 | 3/2008 | Lee et al. | |
| 2008/0158490 | A1* | 7/2008 | Nakayama et al. | 349/117 |
| 2008/0180590 | A1 | 7/2008 | Lee et al. | |
| 2008/0180623 | A1 | 7/2008 | Lee et al. | |
| 2008/0186439 | A1 | 8/2008 | Kwon et al. | |

FOREIGN PATENT DOCUMENTS

| JP | 6-222397 | 8/1994 |
|---|---|---|
| JP | 7-159807 | 6/1995 |
| JP | 9-160041 | 6/1997 |
| JP | 9-160042 | 6/1997 |
| JP | 9-160061 | 6/1997 |
| JP | 10-26765 | 1/1998 |
| JP | 10-90708 | 4/1998 |
| JP | 2005-3802 | 1/2005 |
| JP | 3644653 | 2/2005 |
| JP | 2005-242307 | 9/2005 |

(Continued)

OTHER PUBLICATIONS

U.S. Appl. No. 14/035,025, filed Sep. 24, 2013, Miyazaki et al.

(Continued)

*Primary Examiner* — Richard Kim
*Assistant Examiner* — Ryan Crockett
(74) *Attorney, Agent, or Firm* — Oblon, McClelland, Maier & Neustadt, L.L.P.

(57) ABSTRACT

According to one embodiment, a liquid crystal display device includes a first substrate, a second substrate, a liquid crystal layer, pixels a first polarizer having a first absorption axis, a second polarizer having a second absorption axis, a first retardation film having a first slow axis, and a second retardation film having a second slow axis. Each of the pixels includes a primary pixel electrode and a pair of primary common electrodes. $Re1<Re2$ holds, $Re1+Re2=150\pm50$ nm holds for light having a wavelength of 550 nm, and $Rth1+Rth2=-10\pm50$ nm holds for the light having the wavelength of 550 nm.

11 Claims, 13 Drawing Sheets

(56) References Cited

FOREIGN PATENT DOCUMENTS

| | | |
|---|---|---|
| JP | 2009-75549 | 4/2009 |
| JP | 2009-192822 | 8/2009 |

OTHER PUBLICATIONS

U.S. Appl. No. 13/684,348, filed Nov. 23, 2012, Miyazaki et al.

* cited by examiner

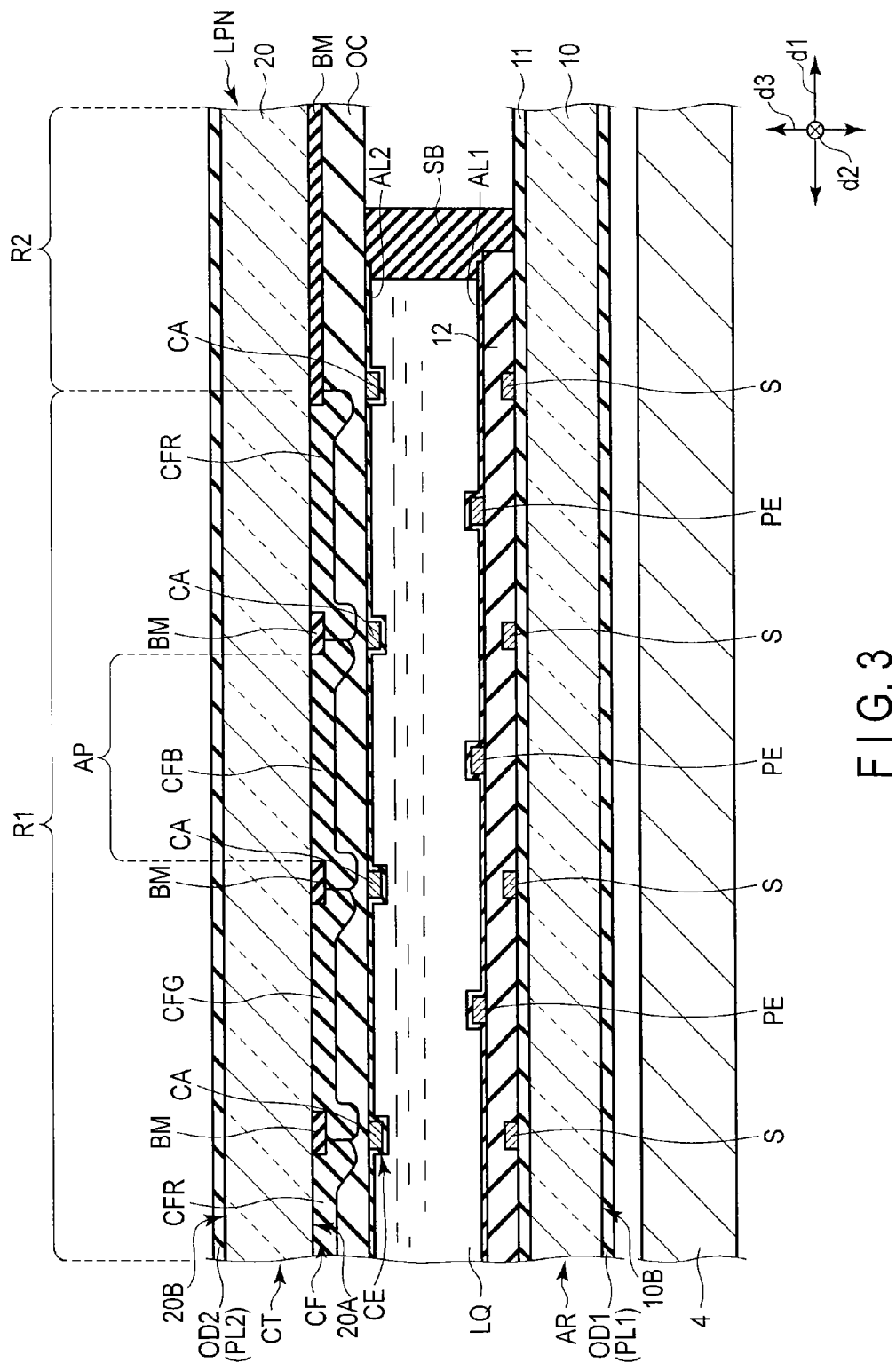
F I G. 3

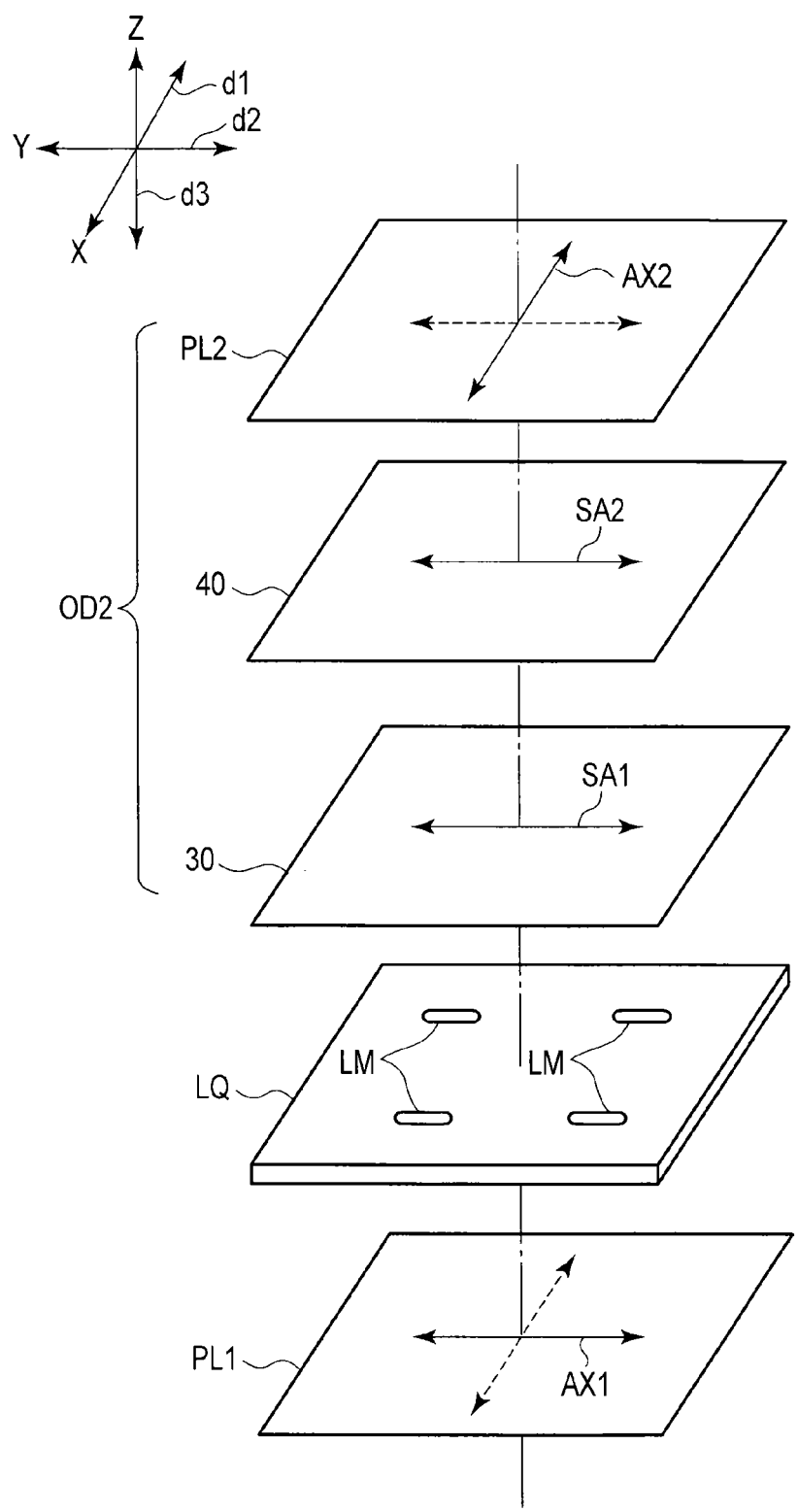
F I G. 6

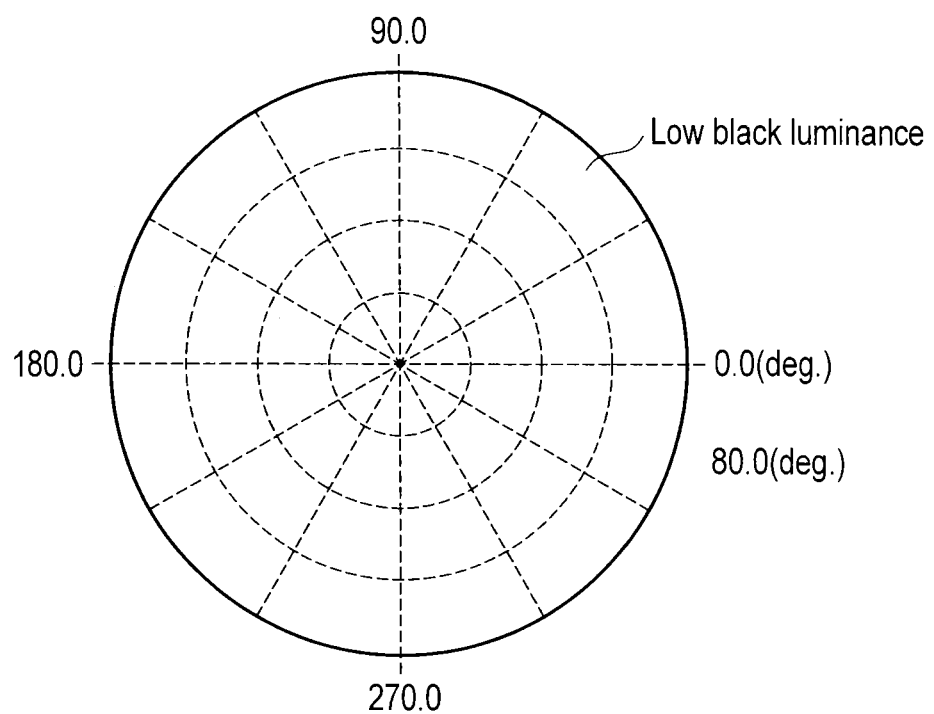
F I G. 7

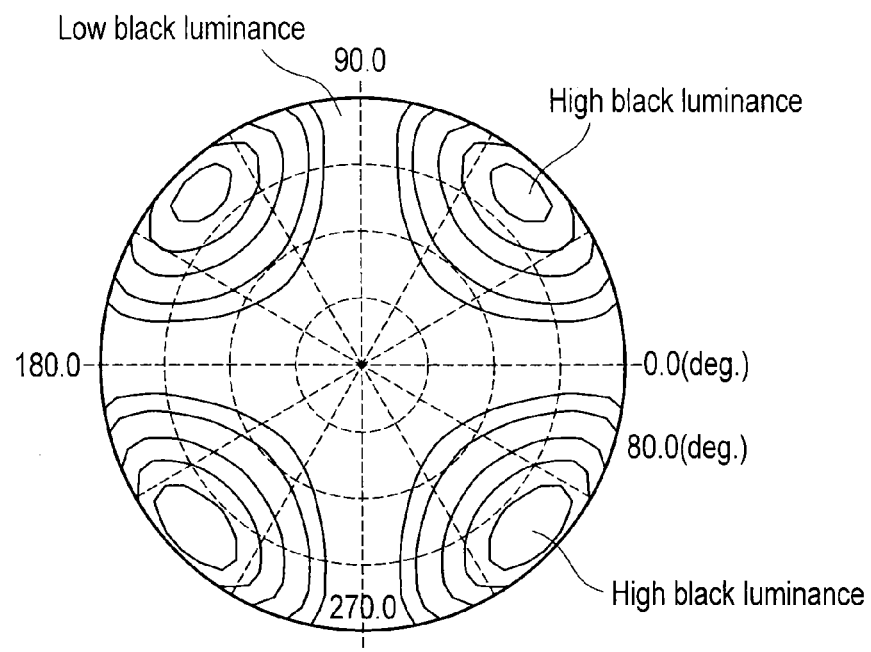
F I G. 9
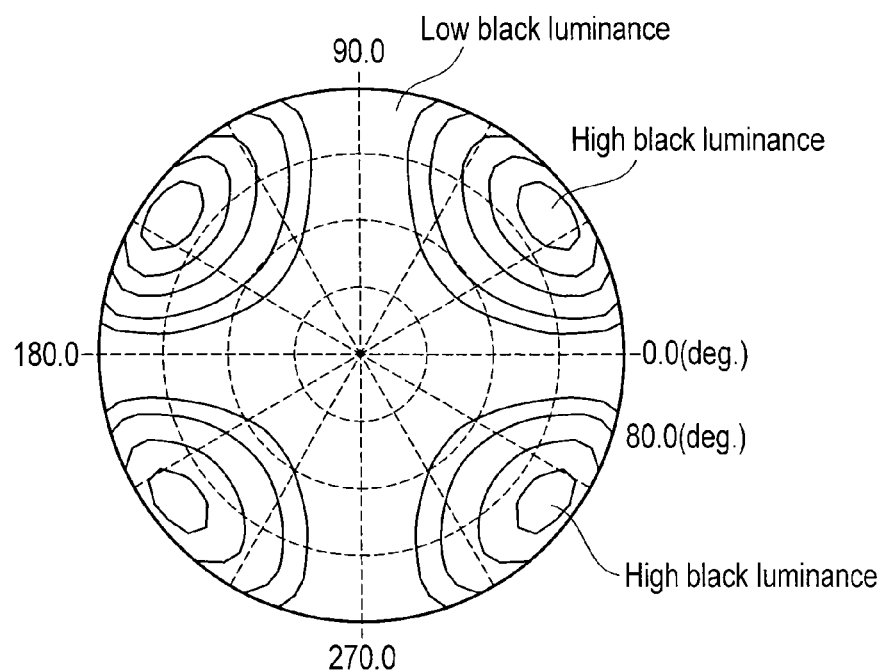
F I G. 10

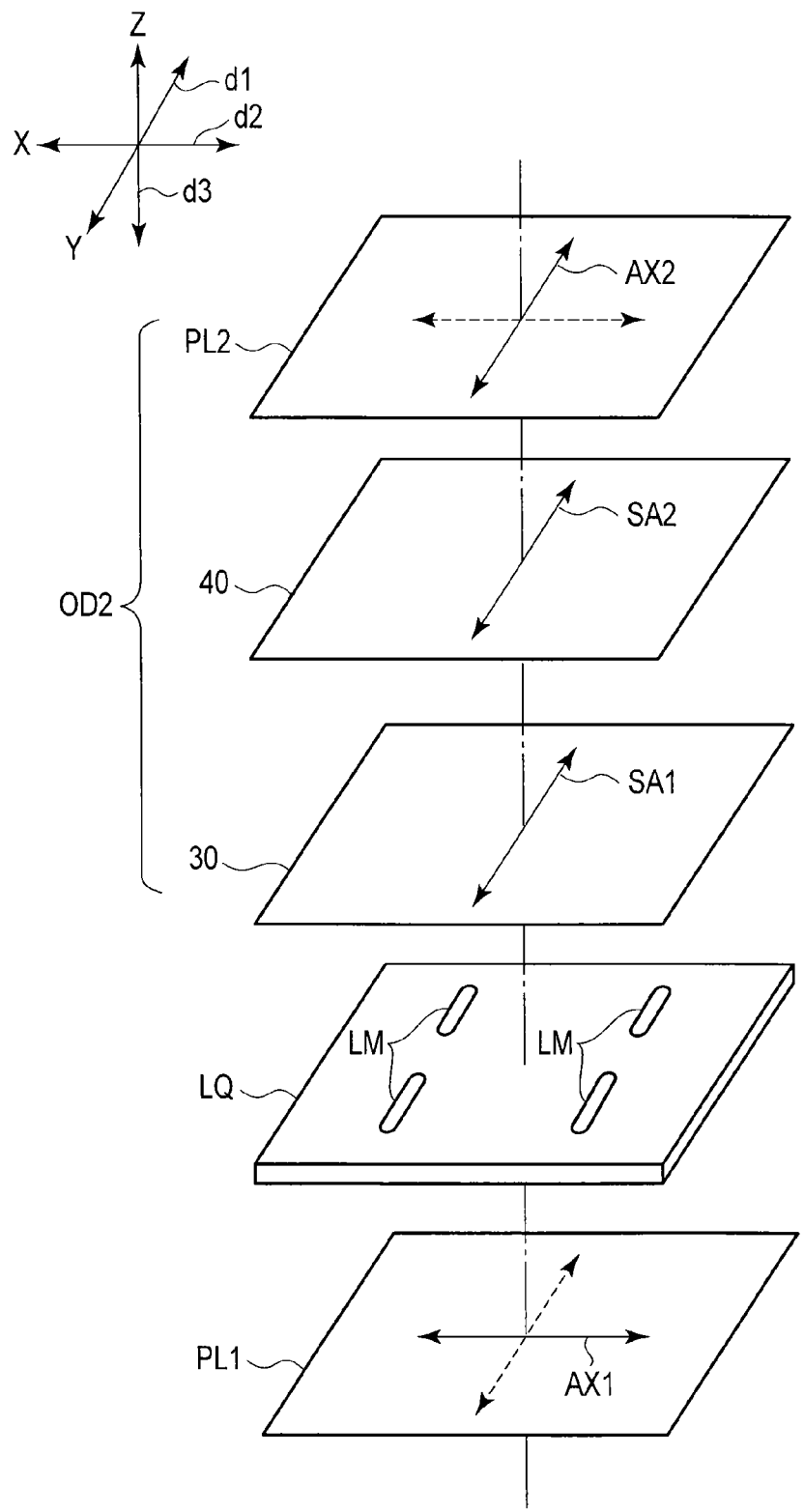
F I G. 12

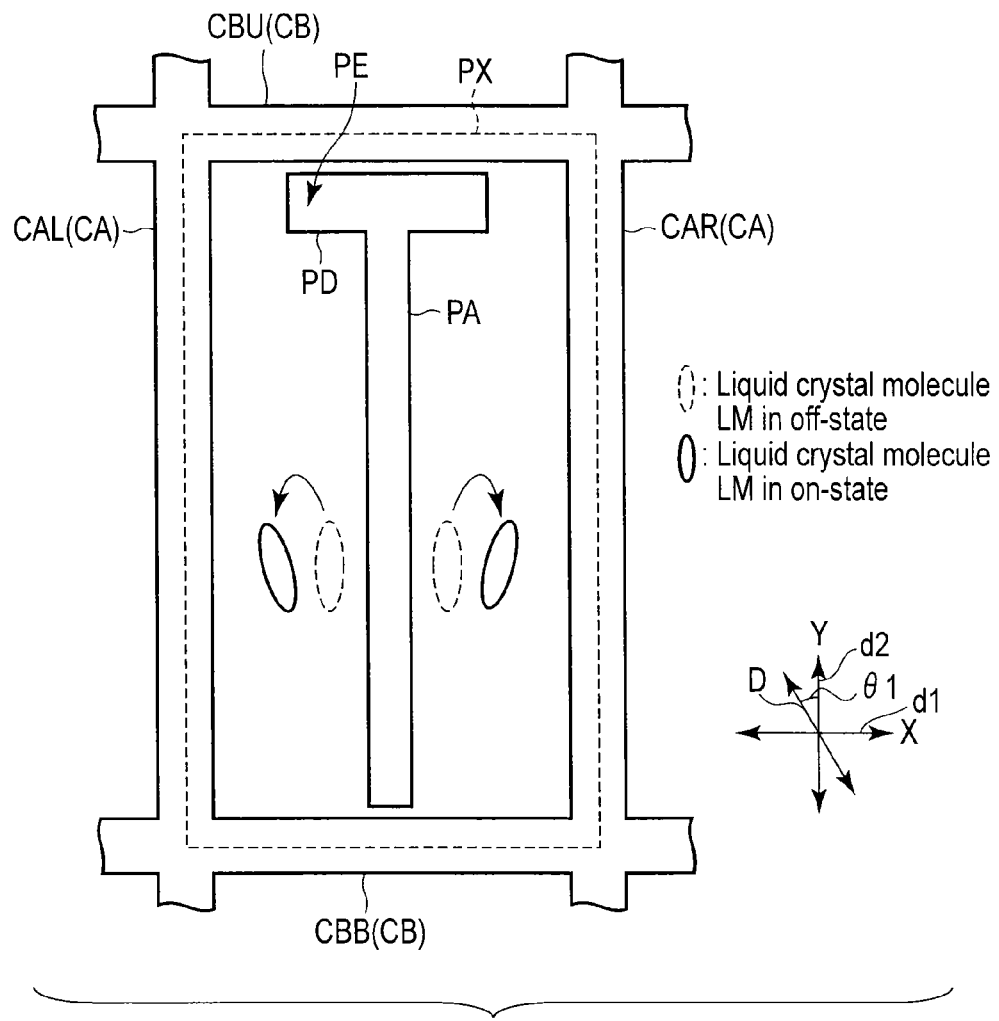
F I G. 14

LIQUID CRYSTAL DISPLAY DEVICE

CROSS-REFERENCE TO RELATED APPLICATIONS

This application is based upon and claims the benefit of priority from Japanese Patent Application No. 2011-212610, filed Sep. 28, 2011, the entire contents of which are incorporated herein by reference.

FIELD

Embodiments described herein relate generally to a liquid crystal display device.

BACKGROUND

In recent years, flat display devices have been actively developed. Among them, liquid crystal display devices are attracting attention because of such advantages as light weight, low profile, and low power consumption. Particularly, a structure in which a lateral electric field (including a fringe electric field), such as an in-plane switching (IPS) mode and a fringe field switching (FFS) mode, a used is attracting attention in an active matrix liquid crystal display device in which a switching element is incorporated in each pixel. The lateral-electric-field-mode liquid crystal display device includes a pixel electrode and a counterelectrode, which are formed in an array substrate, and liquid crystal molecules are switched by the lateral electric field that is substantially parallel to a principal surface of the array substrate.

In contrast, there has also been proposed a technology in which the lateral electric field or an oblique electric field is formed between the pixel electrode formed in the array substrate and the counterelectrode formed in the countersubstrate, and the liquid crystal molecules are switched.

BRIEF DESCRIPTION OF THE DRAWINGS

FIG. 3 is a sectional view schematically illustrating a sectional structure when the liquid crystal display panel in FIG. 2 is cut along a line III-III;

FIG. 6 is an exploded perspective view partially illustrating a liquid crystal display panel of Example 1 according to the embodiment, and is a view schematically illustrating a liquid crystal layer, a polarizer, and a retardation film;

FIG. 7 is a distribution chart of a black luminance of the liquid crystal display device of Example 1;

FIG. 9 is a distribution chart of a black luminance of the liquid crystal display device of Comparative Example 1;

FIG. 10 is a distribution chart of a black luminance of the liquid crystal display device of Comparative Example 2;

FIG. 12 is an exploded perspective view partially illustrating a liquid crystal display panel of still another modification according to the embodiment, and is a view schematically illustrating a liquid crystal layer, a polarizer, and a retardation film;

FIG. 14 is a plan view schematically illustrating another structural example of one pixel when the liquid crystal display panel in FIG. 1 is viewed from the countersubstrate side.

DETAILED DESCRIPTION

Figure 1:
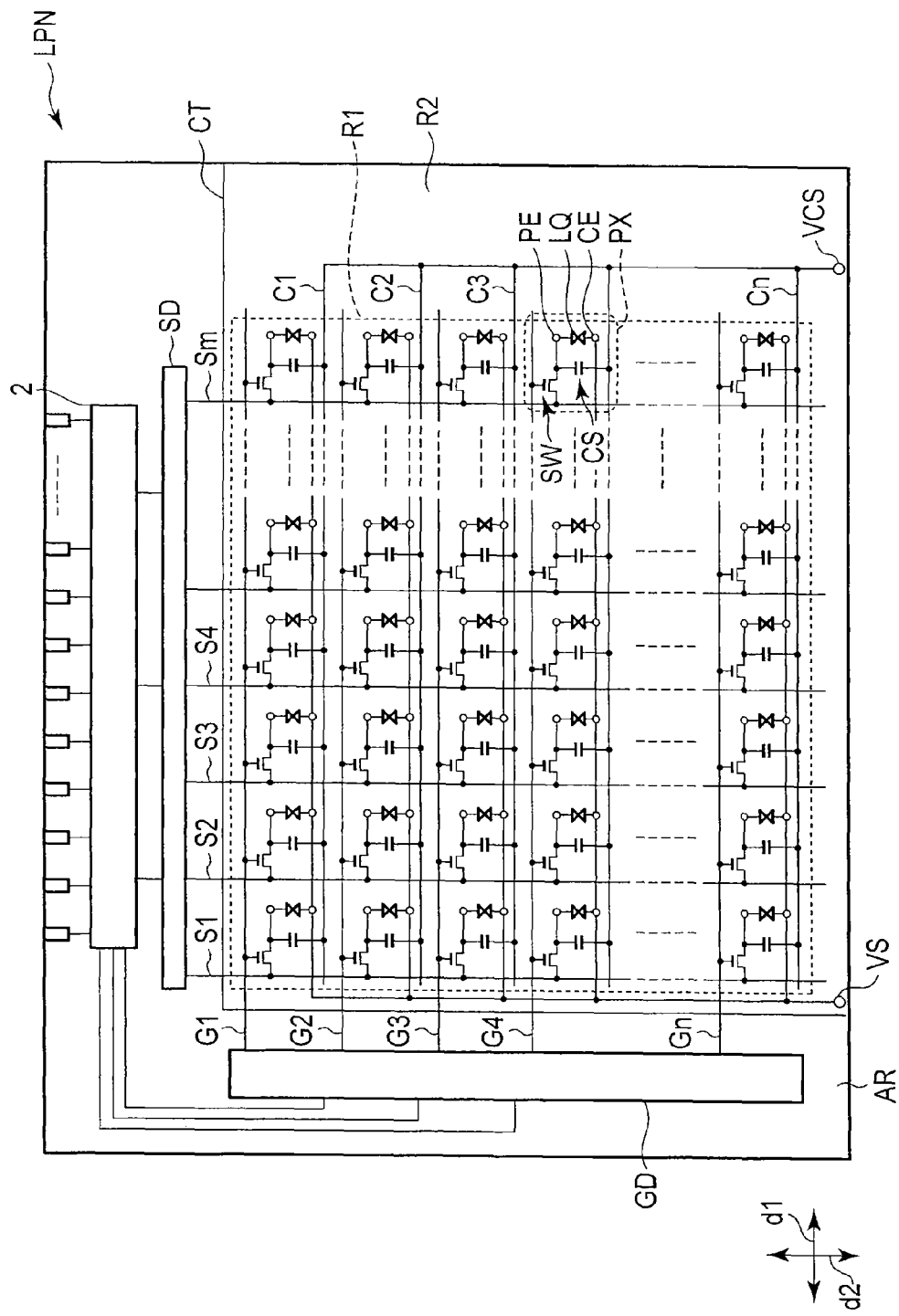
FIG. 1 is a view schematically illustrating a configuration and an equivalent circuit of a liquid crystal display device according to an embodiment.

In general, according to one embodiment, there is provided a liquid crystal display device comprising: a first substrate; a second substrate arranged opposite to the first substrate with a gap; a liquid crystal layer held between the first substrate and the second substrate, a liquid crystal molecule in the liquid crystal layer being initially aligned in a direction substantially parallel to a Y-axis; a plurality of pixels provided in a two-dimensional matrix in a first direction and a second direction orthogonal to the first direction, a length in the first direction being less than a length in the second direction in each of the pixels; a first polarizer disposed in an outer surface of the first substrate and having a first absorption axis parallel to the Y-axis; a second polarizer disposed in an outer surface of the second substrate and having a second absorption axis parallel to an X-axis orthogonal to the Y-axis, the first polarizer and the second polarizer being disposed at a crossed nicols angle; a first retardation film disposed between the second substrate and the second polarizer and having a first slow axis parallel to the Y-axis; and a second retardation film disposed between the first retardation film and the second polarizer and having a second slow axis parallel to the Y-axis. The X-axis is parallel to the first direction. The Y-axis is parallel to the second direction. Each of the pixels comprises: a primary pixel electrode that is provided on the first substrate and extends in the second direction; and a pair of primary common electrodes provided on the second substrate, the primary pixel electrode being interposed between the primary common electrodes in the first direction, the primary common electrodes extending in the second direction. In the first retardation film, it is assumed that nx1 is a refractive index in the X-axis, that ny1 is a refractive index in the Y-axis, that nz1 is a refractive index in a Z-axis orthogonal to the X-axis and the Y-axis, that d1 is a thickness, that $Re1=(nx1-ny1)\cdot d1$ is a horizontal retardation defined by the X-axis and the Y-axis, and that $Rth1=((nx1+ny1)/2-nz1)\cdot d1$ is a vertical retardation along the Z-axis. In the second retardation film, it is assumed that that nx2 is a refractive index in the X-axis, that ny2 is a refractive index in the Y-axis, that nz2 is a refractive index in the Z-axis, that d2 is a thickness, that $Re2=(nx2-ny2)\cdot d2$ is a horizontal retardation value, and that $Rth2=((nx2+ny2)/2-nz2)\cdot d2$ is a vertical retardation value. $Re1<Re2$ holds. $Re1+Re2=150\pm50$ nm holds for light having a wavelength of 550 nm. $Rth1+Rth2=-10\pm50$ nm holds for the light having the wavelength of 550 nm.

According to another embodiment, there is provided a liquid crystal display device comprising: a first substrate; a second substrate arranged opposite to the first substrate with a gap; a liquid crystal layer held between the first substrate and the second substrate, a liquid crystal molecule in the liquid crystal layer being initially aligned in a direction substantially parallel to a Y-axis; a plurality of pixels provided in a two-dimensional matrix in a first direction and a second direction orthogonal to the first direction, a length in the first direction being less than a length in the second direction in each of the pixels; a first polarizer disposed in an outer surface of the first substrate and having a first absorption axis parallel to the Y-axis; a second polarizer disposed in an outer surface of the second substrate and having a second absorption axis parallel to an X-axis orthogonal to the Y-axis, the first polarizer and the second polarizer being disposed at a crossed nicols angle; a first retardation film disposed between the first substrate and the first polarizer and having a first slow axis parallel to the Y-axis; and a second retardation film disposed between the first retardation film and the first polarizer and having a second slow axis parallel to the Y-axis. The X-axis is parallel to the first direction. The Y-axis is parallel to the second direction. Each of the pixels comprises: a primary pixel electrode that is provided on the first substrate and extends in the second direction; and a pair of primary common electrodes provided on the second substrate, the primary pixel electrode being interposed between the primary common electrodes in the first direction, the primary common electrodes extending in the second direction. In the first retardation film, it is assumed that $nx1$ is a refractive index in the X-axis, that $ny1$ is a refractive index in the Y-axis, that $nz1$ is a refractive index in a Z-axis orthogonal to the X-axis and the Y-axis, that $d1$ is a thickness, that $Re1=(nx1-ny1)\cdot d1$ is a horizontal retardation defined by the X-axis and the Y-axis, and that $Rth1=((nx1+ny1)/2-nz1)\cdot d1$ is a vertical retardation along the Z-axis. In the second retardation film, it is assumed that that $nx2$ is a refractive index in the X-axis, that $ny2$ is a refractive index in the Y-axis, that $nz2$ is a refractive index in the Z-axis, that $d2$ is a thickness, that $Re2=(nx2-ny2)\cdot d2$ is a horizontal retardation value, and that $Rth2=((nx2+ny2)/2-nz2)\cdot d2$ is a vertical retardation value. $Re1<Re2$ holds. $Re1+Re2=150\pm50$ nm holds for light having a wavelength of 550 nm. $Rth1+Rth2=-10\pm50$ nm holds for the light having the wavelength of 550 nm.

According to another embodiment, there is provided a liquid crystal display device comprising: a first substrate; a second substrate arranged opposite to the first substrate with a gap; a liquid crystal layer held between the first substrate and the second substrate, a liquid crystal molecule in the liquid crystal layer being initially aligned in a direction substantially parallel to a Y-axis; a plurality of pixels provided in a two-dimensional matrix in a first direction and a second direction orthogonal to the first direction, a length in the first direction being less than a length in the second direction in each of the pixels; a first polarizer disposed in an outer surface of the first substrate and having a first absorption axis parallel to an X-axis orthogonal to the Y-axis; a second polarizer disposed in an outer surface of the second substrate and having a second absorption axis parallel to the Y-axis, the first polarizer and the second polarizer being disposed at a crossed nicols angle; a first retardation film disposed between the second substrate and the second polarizer and having a first slow axis parallel to the Y-axis; and a second retardation film disposed between the first retardation film and the second polarizer and having a second slow axis parallel to the Y-axis. The X-axis is parallel to the second direction. The Y-axis is parallel to the first direction. Each of the pixels comprises: a primary pixel electrode that is provided on the first substrate and extends in the second direction; and a pair of primary common electrodes provided on the second substrate, the primary pixel electrode being interposed between the primary common electrodes in the first direction, the primary common electrodes extending in the second direction. In the first retardation film, it is assumed that $nx1$ is a refractive index in the X-axis, that $ny1$ is a refractive index in the Y-axis, that $nz1$ is a refractive index in a Z-axis orthogonal to the X-axis and the Y-axis, that $d1$ is a thickness, that $Re1=(nx1-ny1)\cdot d1$ is a horizontal retardation defined by the X-axis and the Y-axis, and that $Rth1=((nx1+ny1)/2-nz1)\cdot d1$ is a vertical retardation along the Z-axis. In the second retardation film, it is assumed that that $nx2$ is a refractive index in the X-axis, that $ny2$ is a refractive index in the Y-axis, that $nz2$ is a refractive index in the Z-axis, that $d2$ is a thickness, that $Re2=(nx2-ny2)\cdot d2$ is a horizontal retardation value, and that $Rth2-((nx2+ny2)/2-nz2)\cdot d2$ is a vertical retardation value. $Re1<Re2$ holds. $Re1+$ Re2=150±50 nm holds for light having a wavelength of 550 nm. Rth1 +Rth2=−10±50 nm holds for the light having the wavelength of 550 nm.

Hereinafter, a liquid crystal display device according to an embodiment will be described in detail with reference to the drawings. In the drawings, a component exerting an identical or similar function is designated by an identical reference sign, and the overlapping description is omitted. A configuration of a liquid crystal display device in which a lateral electric field mode or an oblique electric field mode is adopted by a technique different from the IPS (In-Plane Switching) mode and the FFS (Fringe Field Switching) mode will be described.

FIG. 1 is a view schematically illustrating a configuration and an equivalent circuit of a liquid crystal display device according to an embodiment.

As illustrated in FIG. 1, the liquid crystal display device includes an active matrix liquid crystal display panel LPN. The liquid crystal display panel LPN includes an array substrate AR that is of the first substrate, a countersubstrate CT that is of the second substrate arranged opposite to the array substrate AR, and a liquid crystal layer LQ that is held between the array substrate AR and the countersubstrate CT. The liquid crystal display panel LPN includes a display area R1 where an image is displayed. The display area R1 overlaps the array substrate AR, the countersubstrate CT, and the liquid crystal layer LQ. An m×n matrix of plural pixels PX is disposed in the display area R1 (m and n are positive integers).

In the display area R1, the liquid crystal display panel LPN includes n gate lines G (G1 to Gn), n auxiliary capacitance lines C (C1 to Cn), and m source lines S (S1 to Sm). For example, the gate lines G and the auxiliary capacitance lines C extend substantially linearly along a first direction d1. The gate lines G and the auxiliary capacitance lines C are alternately disposed in parallel to a second direction d2 intersecting the first direction d1. The first direction d1 and the second direction d2 are orthogonal to each other. The source lines S intersect the gate lines G and the auxiliary capacitance lines C. The source lines S extend substantially linearly along the second direction d2. The gate lines G, the auxiliary capacitance lines C, and the source lines S do not always extend linearly, but the gate lines G, the auxiliary capacitance lines C, and the source lines S may partially be bent.

Each gate line G is drawn to an outside of the display area R1, and connected to a gate driver GD. Each source line S is drawn to the outside of the display area R1, and connected to a source driver SD. For example, at least part of each of the gate driver GD and the source driver SD is formed in the array substrate AR, and connected to a drive IC chip 2 provided with a controller.

Each pixel PX includes a switching element SW, a pixel electrode PE, and a common electrode CE. For example, a retention capacitance Cs is formed between the auxiliary capacitance line C and the pixel electrode PE. The auxiliary capacitance line C is electrically connected to a voltage applied portion VCS to which an auxiliary capacitance voltage is applied.

The liquid crystal display panel LPN of the embodiment has a configuration in which the pixel electrode PE is formed on the array substrate AR while at least part of the common electrode CE is formed on the countersubstrate CT, and the liquid crystal molecules of the liquid crystal layer LQ are switched by mainly utilizing the electric field formed between the pixel electrode PE and the common electrode CE. The electric field formed between the pixel electrode PE and the common electrode CE is an oblique electric field (or a lateral electric field substantially parallel to a substrate principal surface) that is slightly oblique to the plane defined by the first direction d1 and the second direction d2 or the substrate principal surface.

For example, the switching element SW is constructed by an n-channel thin-film transistor (TFT). The switching element SW is electrically connected to the gate line G and the source line S. Either a top gate type switching element or a bottom gate type switching element may be used as the switching element SW. For example, a semiconductor layer of the switching element SW is made of polysilicon. Alternatively, the semiconductor layer may be made of amorphous silicon.

The pixel electrode PE is disposed in each pixel PX, and electrically connected to the switching element SW. The common electrode CE is commonly disposed with respect to the pixel electrodes PE of the pixels PX while the liquid crystal layer LQ is interposed between the common electrode CE and the pixel electrodes PE. For example, the pixel electrode PE and the common electrode CE are made of optically-transparent conductive materials, such as indium tin oxide (ITO) and indium zinc oxide (IZO). Alternatively, the pixel electrode PE and the common electrode CE may be made of metallic materials, such as aluminum.

The array substrate AR includes a power feeding portion VS that is used to apply a voltage (common voltage) to the common electrode CE. For example, the power feeding portion VS is formed in a non-display area R2 outside the display area R1. The common electrode CE is drawn to the outside of the display area R1, and electrically connected to the power feeding portion VS through a conductive member (not illustrated).

Figure 2:
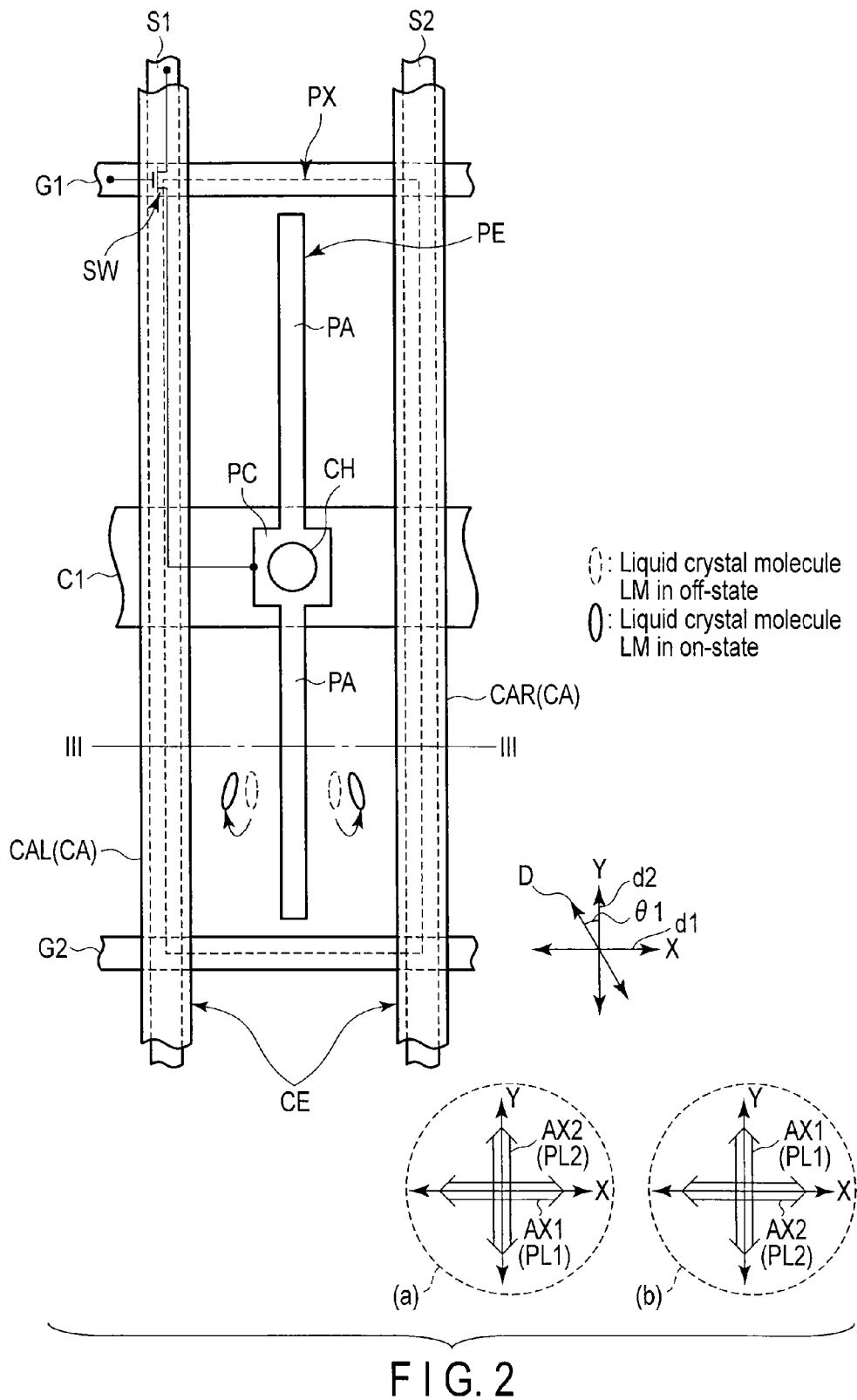
FIG. 2 is a plan view schematically illustrating a structural example of one pixel when the liquid crystal display panel in FIG. 1 is viewed from a countersubstrate side.

FIG. 2 is a plan view schematically illustrating a structural example of the pixel PX when the liquid crystal display panel LPN in FIG. 1 is viewed from a countersubstrate side.

As illustrated by a dashed line in FIG. 2, the pixel PX has a rectangular shape in which a length of the first direction d1 is less than a length of the second direction d2. Gate lines G1 and G2 extend of the first direction d1. Auxiliary capacitance line C1 is disposed between gate lines G1 and G2 adjacent to each other, and extends along the first direction d1. Source lines S1 and S2 extend of the second direction d2. The pixel electrode PE is disposed between source lines S1 and S2 adjacent to each other. The pixel electrode PE is located between gate lines G1 and G2.

In the pixel PX in FIG. 2, source line S1 is disposed in a left end portion, and source line S2 is disposed in a right end portion. Strictly, source line S1 is disposed while striding across a boundary between the pixel PX and the pixel adjacent to the pixel PX on the left side, and source line S2 is disposed while striding across a boundary between the pixel PX and the pixel adjacent to the pixel PX on the right side. In the pixel PX, gate line G1 is disposed in an upper end portion, and gate line G2 is disposed in a lower end portion. Strictly, gate line G1 is disposed while striding across a boundary between the pixel PX and the pixel adjacent to the pixel PX on the upper side, and gate line G2 is disposed while striding across a boundary between the pixel PX and the pixel adjacent to the pixel PX on the lower side. Auxiliary capacitance line C1 is disposed in a substantially central portion of the pixel.

In FIG. 2, the switching element SW is electrically connected to gate line G1 and source line S1. The switching element SW is provided at intersection of gate line G1 and source line S1. A drain line of the switching element SW is extended along source line S1 and auxiliary capacitance line C1, and electrically connected to the pixel electrode PE through a contact hole CH that is made in a region overlapping auxiliary capacitance line C1. The switching element SW is provided in the region overlapping source line S1 and auxiliary capacitance line C1. The switching element SW does not run over from the region overlapping source line S1 and auxiliary capacitance line C1, but suppresses reduction of an area of an aperture contributing to the display.

The pixel electrodes PE are arrayed at predetermined intervals in the first direction d1 and second direction d2. The pixel electrode PE includes a primary pixel electrode PA, which is formed while extending in the second direction d2.

The pixel electrode PE of the embodiment includes the primary pixel electrode PA and a contact portion PC, which are electrically connected to each other. The primary pixel electrode PA extends linearly along the second direction d2 from the contact portion PC to neighborhoods of the upper and lower end portions of the pixel PX. The primary pixel electrode PA is formed into a belt shape having a substantially constant width of the first direction d1. The contact portion PC is located in the region overlapping auxiliary capacitance line C1, and electrically connected to the switching element SW through the contact hole CH. The contact portion PC is formed wider than the primary pixel electrode PA.

The pixel electrode PE is disposed in substantially the middle position of source lines S1 and S2, namely, in the center of the pixel PX. A distance between source line S1 and the pixel electrode PE in the first direction d1 is substantially equal to a distance between source line S2 and the pixel electrode PE in the first direction d1.

The common electrode CE includes plural primary common electrodes CA. In the first direction d1 in the plane of the liquid crystal display panel LPN, the primary common electrodes CA are arrayed at predetermined intervals, the primary pixel electrodes PA are interposed between the primary common electrodes CA in the first direction d1, and the primary common electrodes CA extend linearly along the second direction d2 that is substantially parallel to the primary pixel electrodes PA. The primary common electrode CA is disposed opposite the source line S while extending substantially parallel to the primary pixel electrode PA. The primary common electrode CA is formed into a belt shape having a substantially constant width of the first direction d1.

In FIG. 2, the two primary common electrodes CA are parallel to each other of the first direction d1, and disposed at right and left end portions of the pixel PX. Hereinafter, in order to distinguish the primary common electrodes CA, the primary common electrode on the left side in FIG. 2 is designated by CAL, and the primary common electrode on the right side is designated by CAR. Primary common electrode CAL is disposed opposite source line S1, and primary common electrode CAR is disposed opposite source line S2.

In the pixel PX, primary common electrode CAL is disposed in the left end portion, and primary common electrode CAR is disposed in the right end portion. Strictly, primary common electrode CAL is disposed while striding across the boundary between the pixel PX and the pixel adjacent to the pixel PX on the left side, and primary common electrode CAR is disposed while striding across the boundary between the pixel PX and the pixel adjacent to the pixel PX on the right side.

When attention is focused on a positional relationship between the pixel electrode PE and the primary common electrode CA, the pixel electrodes PE and the primary common electrodes CA are alternately disposed in the first direction d1. The pixel electrodes PE and the primary common electrodes CA are disposed substantially parallel to each other. At this point, in the plane of the liquid crystal display panel LPN, no primary common electrode CA overlaps the pixel electrode PE.

That is, one pixel electrode PE is located between primary common electrode CAL and primary common electrode CAR, which are adjacent to each other. In other words, the pair of primary common electrodes (primary common electrode CAL and primary common electrode CAR) are disposed on both sides of the position immediately above the pixel electrode PE. In other words, the pixel electrode PE is disposed between primary common electrode CAL and primary common electrode CAR. Therefore, primary common electrode CAL, the primary pixel electrode PA, and primary common electrode CAR are disposed in this order along the first direction d1.

A distance between the pixel electrode PE and the common electrode CE is substantially kept constant in the first direction d1. That is, in the first direction d1, the distance between primary common electrode CAL and the primary pixel electrode PA is substantially equal to the distance between primary common electrode CAR and the primary pixel electrode PA.

FIG. 3 is a sectional view schematically illustrating a sectional structure when the liquid crystal display panel LPN in FIG. 2 is cut along a line III-III. Only the point necessary for the description is illustrated in FIG. 3. As illustrated in FIG. 3, a backlight unit 4 is disposed on a rear surface side of the array substrate AR constituting the liquid crystal display panel LPN. Various configurations can be adopted in the backlight unit 4, a light emitting diode (LED) or a cold-cathode fluorescent lamp (CCFL) can be used as a light source, and the description of detailed structure is omitted.

The array substrate AR is constructed by a first insulating substrate 10 having optical transparency. The source line S is provided on a first interlayer insulating film 11 and covered with a second interlayer insulator 12. For example, the gate line (not illustrated) and the auxiliary capacitance line (not illustrated) are disposed between the first insulating substrate 10 and the first interlayer insulating film 11. The pixel electrode PE is formed on the second interlayer insulating film 12. The pixel electrode PE is located inside the position immediately above the source line S.

A first alignment film AL1 is disposed in a surface of the array substrate AR, which is opposite to the countersubstrate CT, and extends over substantially the whole display area R1. The first alignment film AL1 covers the pixel electrode PE, and is also disposed on the second interlayer insulating film 12. The first alignment film AL1 is made of a material exerting a horizontal alignment.

The array substrate AR may partially includes the common electrode CE.

The countersubstrate CT is constructed by a second insulating substrate 20 having the optical transparency. The countersubstrate CT includes a black matrix BM, a color filter CF, an overcoat layer OC, a common electrode CE, and a second alignment film AL2.

The black matrix BM partitions the pixels PX to form an aperture AP opposite to the pixel electrode PE. That is, the black matrix BM is disposed opposite line portions, such as the source line S, the gate line, the auxiliary capacitance line, and the switching element. Although only the portion exposed along the second direction d2 is illustrated in the black matrix BM, the black matrix BM may include a portion extending along the first direction d1. The black matrix BM is disposed in an inner surface 20A opposite the array substrate AR of the second insulating substrate 20.

The color filter CF is disposed corresponding to each pixel PX. That is, the color filter CF is disposed in the aperture AP in the inner surface 20A of the second insulating substrate 20, and runs partially on the black matrix BM. The color filters CF, which are disposed in the pixels PX adjacent to each other in the first direction d1, differ from each other in color. For example, the color filter CF is made of a resin material colored in primary colors, such as a red, a blue, and a green. A red color filter CFR made of the resin material colored in the red is disposed corresponding to a red pixel. A blue color filter CFB made of the resin material colored in the blue is disposed corresponding to a blue pixel. A green color filter CFG made of the resin material colored in the green is disposed corresponding to a green pixel. A boundary between the color filters CF is located at a position opposing the black matrix BM.

The overcoat layer OC covers the color filter CF. The overcoat layer OC reduces an influence of surface irregularity of the color filter CF.

The common electrode CE is provided on the overcoat layer OC and opposed to the array substrate AR. The distance between the common electrode CE and the pixel electrode PE is substantially kept constant in a third direction d3. The third direction d3 is a direction orthogonal to the first direction d1 and the second direction d2 or a normal direction of the liquid crystal display panel LPN.

The second alignment film AL2 is disposed in a surface of the countersubstrate CT, which is opposite to the array substrate AR, and extends over substantially the whole display area R1. The second alignment film AL2 covers the common electrode CE and the overcoat layer OC. The second alignment film AL2 is made of a material exerting the horizontal alignment.

An alignment treatment (such as rubbing and photo-alignment) is performed to the first alignment film AL1 and the second alignment film AL2 for the purpose of initial alignment of the liquid crystal molecule in the liquid crystal layer LQ. In the embodiment, for example, the liquid crystal layer LQ has positive dielectric anisotropy, namely, the liquid crystal layer LQ is made of a p-type liquid crystal.

In the array substrate AR and the countersubstrate CT, the first alignment film AL1 and the second alignment film AL2 are disposed opposite to each other. At this point, a predetermined cell gap, for example, the cell gap ranging from 2 to 7 μm is formed between the first alignment film AL1 and the second alignment film AL2 by a columnar spacer, which is made of a resin material while being integrally with one of the substrates. The array substrate AR and the substrate CT are bonded with a sealing member SB outside the display area R1 while the cell gap is formed.

In the first direction d1, the distance between the primary pixel electrode PA and the primary common electrode CA is greater than a thickness (cell gap) of the liquid crystal layer LQ, and the distance between the primary pixel electrode PA and the primary common electrode CA is greater than or equal to double the thickness (cell gap) of the liquid crystal layer LQ.

The liquid crystal layer LQ is disposed between the first alignment film AL1 and the second alignment film AL2 while retained in the cell gap formed between the array substrate AR and the countersubstrate CT.

Using a bonding agent, a first optical element OD1 is bonded to an outer surface of the array substrate AR, namely, an outer surface 10B of the first insulating substrate 10 constituting the array substrate AR. The first optical element OD1 is located on the side of the liquid crystal display panel LPN, which is opposite to the backlight unit 4, and the first optical element OD1 controls a polarization state of light incident from the backlight unit 4 to the liquid crystal display panel LPN. The first optical element OD1 includes a first polarizer PL1 having a first polarizing axis (or a first absorption axis) AX1.

Using a bonding agent, a second optical element OD2 is bonded to an outer surface of the countersubstrate CT, namely, an outer surface 20B of the second insulating substrate 20 constituting the countersubstrate CT. The second optical element OD2 is located on the display surface side of the liquid crystal display panel LPN, and controls the polarization state of the outgoing light output from the liquid crystal display panel LPN. The second optical element OD2 includes a second polarizer PL2 having a second polarizing axis (or a second absorption axis) AX2.

For example, because the first polarizing axis AX1 and the second polarizing axis AX2 are orthogonal to each other, the first polarizer PL1 and the second polarizer PL2 are disposed with crossed nicols. At this point, one of the polarizers is disposed such that a polarizing axis of the polarizer is parallel or orthogonal to an initial alignment direction of the liquid crystal molecule. In the embodiment, because a liquid crystal molecule LM is initially aligned in the direction of a substantial Y-axis, the polarizing axis of one of the polarizers is parallel to the Y-axis or an X-axis orthogonal to the Y-axis.

In the embodiment, the X-axis is parallel to the first direction d1, and the Y-axis is parallel to the second direction d2. Therefore, the liquid crystal molecule LM initially aligned in the direction of the substantial Y-axis, and initially aligned in the second direction d2 in which the primary pixel electrode PA and the primary common electrode CA extend.

In the part (a) of FIG. 2, the first polarizer PL1 is disposed such that the first polarizing axis AX1 of the first polarizer PL1 is orthogonal to the initial alignment direction (Y-axis) of the liquid crystal molecule LM (that is, parallel to the X-axis), and the second polarizer PL2 is disposed such that the second polarizing axis AX2 of the second polarizer PL2 is parallel to the initial alignment direction of the liquid crystal molecule LM (that is, parallel to the Y-axis).

In the part (b) of FIG. 2, the second polarizer PL2 is disposed such that the second polarizing axis AX2 of the second polarizer PL2 is orthogonal to the initial alignment direction (Y-axis) of the liquid crystal molecule LM (that is, parallel to the X-axis), and the first polarizer PL1 is disposed such that the first polarizing axis AX1 of the first polarizer PL1 is parallel to the initial alignment direction of the liquid crystal molecule LM (that is, parallel to the Y-axis).

An operation of the liquid crystal display panel LPN having the above configuration will be described below.

As illustrated in FIGS. 2 and 3, in the case that the voltage is not applied to the liquid crystal layer LQ, namely, in the case that the electric field is not formed between the pixel electrode PE and the common electrode CE (while off), the liquid crystal molecule LM of the liquid crystal layer LQ is aligned such that a long axis of the liquid crystal molecule LM is oriented toward the alignment treatment direction of the first alignment film AL1 and the alignment treatment direction of the second alignment film AL2. The state while off corresponds to the initial alignment state, and alignment direction of the liquid crystal molecule LM while off corresponds to the initial alignment direction.

Strictly, the liquid crystal molecule LM is not always aligned in parallel to the plane of the liquid crystal display panel LPN, but the liquid crystal molecule LM is aligned at a pretilt angle near the alignment film. Therefore, the initial alignment direction of the liquid crystal molecule LM means a direction in which the long axis of the liquid crystal molecule LM while off is orthographically projected to an X-Y plane. For the sake of convenience, it is assumed that the liquid crystal molecule LM is aligned in parallel to the X-Y plane, and that the liquid crystal molecule LM rotates in a plane parallel to the X-Y plane.

While off, the liquid crystal molecule LM is initially aligned such that the long axis is initially aligned substantially parallel to the Y-axis as illustrated by a dashed line in FIG. 2. That is, the initial alignment direction of the liquid crystal molecule LM is parallel to the Y-axis (or 0° with respect to the Y-axis).

The light emitted from the backlight unit 4 is partially incident to the liquid crystal display panel LPN through the first polarizer PL1. The polarization state of the light incident to the liquid crystal display panel LPN depends on the alignment state of the liquid crystal molecule LM when the light passes through the liquid crystal layer LQ. While off, the light passing through the liquid crystal layer LQ is absorbed by the second polarizer PL2 (black display).

On the other hand, in the state in which the voltage is applied to the liquid crystal layer LQ, namely, in the state in which the electric field is formed between the pixel electrode PE and the common electrode CE (while on), the lateral electric field (or the oblique electric field) substantially parallel to the substrate is formed between the pixel electrode PE and the common electrode CE. The liquid crystal molecule LM is affected by the electric field, and the long axis of the liquid crystal molecule LM rotates in the plane parallel to the X-Y plane as illustrated by a continuous line in FIG. 2.

In the liquid crystal layer LQ in FIG. 2, the liquid crystal molecule LM located in the domain between the pixel electrode PE and primary common electrode CAL rotates clockwise with respect to the Y-axis, and is aligned toward the lower left direction in FIG. 2. In the liquid crystal layer LQ in FIG. 2, the liquid crystal molecule LM located in the domain between the pixel electrode PE and primary common electrode CAR rotates counterclockwise with respect to the Y-axis, and is aligned toward the lower right direction in FIG. 2.

In each pixel PX, in the state in which the electric field is formed between the pixel electrode PE and the common electrode CE, the alignment direction of the liquid crystal molecule LM is divided into plural directions at the boundary of the pixel electrode PE, and the liquid crystal molecule LM forms domains in each alignment direction. That is, plural domains are formed in one pixel PX.

While on, the light emitted from the backlight unit 4 is partially incident to the liquid crystal display panel LPN through the first polarizer PL1. The polarization state of the light incident to the liquid crystal layer LQ varies. While on, at least part of the light passing through the liquid crystal layer LQ is transmitted through the second polarizer PL2 (white display).

Figure 4:
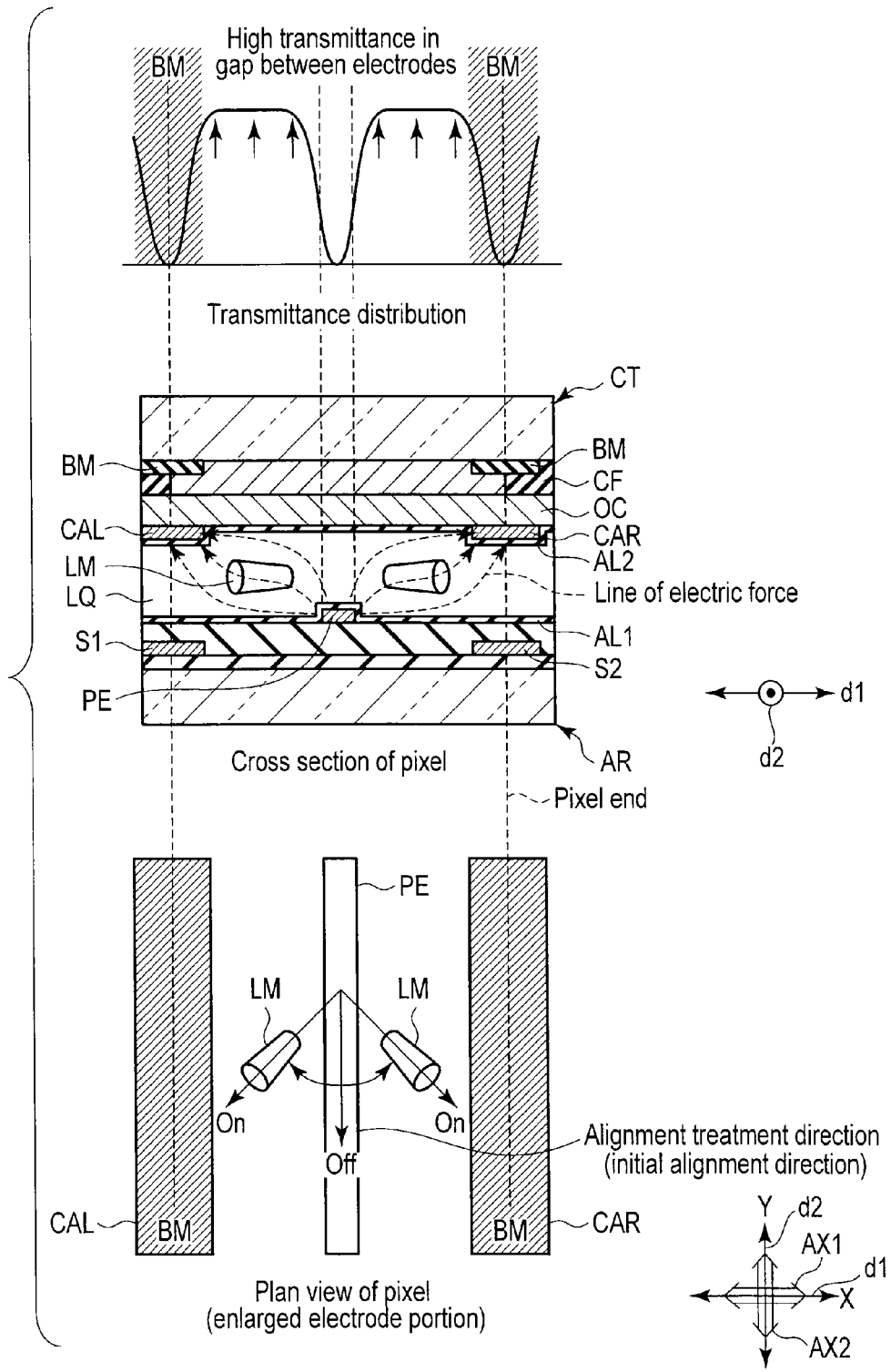
FIG. 4 is a view illustrating an electric field formed between a pixel electrode and a common electrode in the liquid crystal display panel in FIG. 2 and a relationship between a director of a liquid crystal molecule and a transmittance by the electric field.

FIG. 4 is a view illustrating the electric field formed between the pixel electrode PE and the common electrode CE in the liquid crystal display panel LPN in FIG. 2 and a relationship between a director of the liquid crystal molecule LM and the transmittance by the electric field.

As illustrated in FIG. 4, in an off state, the liquid crystal molecule LM is initially aligned in the direction substantially parallel to the Y-axis. In an on state in which a potential difference is formed between the pixel electrode PE and the common electrode CE, an optical modulation factor of the liquid crystal becomes the maximum (that is, the transmittance becomes the maximum in the aperture) when the director (or the long axis) of the liquid crystal molecule LM is substantially deviated in the X-Y plane by 45° with respect to the first polarizing axis AX1 and the second polarizing axis AX2.

In FIG. 4, in the on state, the director of the liquid crystal molecule between primary common electrode CAL and the pixel electrode PE and the director of the liquid crystal molecule between primary common electrode CAR and the pixel electrode PE are oriented toward the direction that is oblique by 45° with respect to the pixel electrode PE. Therefore, the peak transmittance is obtained. At this point, when attention is focused on a transmittance distribution per pixel, the high transmittance is obtained in a substantially whole gap between the pixel electrode PE and the common electrode CE while the transmittance substantially becomes zero on the pixel electrode PE and the common electrode CE.

Primary common electrode CAL located immediately above source line S1 and primary common electrode CAR located immediately above source line S2 are opposite to the black matrix BM. Each of primary common electrodes CAL and CAR has a width that is less than or equal to a width in the first direction d1 of the black matrix BM, but primary common electrode CAL and primary common electrode CAR do not extend onto the side of the pixel electrode PE beyond the position in which each of primary common electrodes CAL and CAR overlaps the black matrix BM. Therefore, the aperture contributing to the display per pixel corresponds to the region between the pixel electrode PE and each of primary common electrodes CAL and CAR in the region between the black matrices BM or in the region between source line S1 and source line S2.

According to the liquid crystal display device having the above configuration, each pixel PX includes the primary pixel electrode PA and the pair of primary common electrodes CA. The primary pixel electrode PA is provided on the first insulating substrate 10 (array substrate AR), and extends in the second direction d2. The primary common electrodes CA are provided on the second insulating substrate 20 (countersubstrate CT), located with the primary pixel electrode PA interposed therebetween in the first direction d1, and extend in the second direction d2.

The liquid crystal display device is configured such that the electric field formed between the primary pixel electrode PA and the primary common electrode CA is mainly applied to the liquid crystal layer LQ. Therefore, the liquid crystal display device in which the lateral electric field mode or the oblique electric field mode, which is different from the IPS mode or the FFS mode, is adopted can be obtained.

Because the high transmittance is obtained in the gap between the pixel electrode PE and the common electrode CE, the transmittance per pixel can sufficiently be enhanced by increasing an inter-electrode distance between the pixel electrode PE and each of primary common electrodes CAL and CAR. For product specifications having different pixel pitches, the peak condition of the transmittance distribution in FIG. 4 can be used by changing the inter-electrode distance (that is, the position where the primary common electrode CA is disposed is changed with respect to the pixel electrode PE disposed in the substantial center of the pixel PX). That is, in the display mode of the embodiment, from a specification of a low-resolution product having a relatively large pixel pitch to a specification of a high-resolution product having a relatively small pixel pitch, it is not always necessary to finely process the electrode, but products having various pixel pitches can be provided by setting the inter-electrode distance. Accordingly, needs for the high transmittance and the high resolution can easily be implemented.

According to the embodiment, as illustrated in FIG. 4, the transmittance decreases sufficiently when attention is focused on the transmittance distribution in the region overlapping the black matrix BM. This is attributed to the fact that a leakage of the electric field is not generated outside the pixel beyond the position of the common electrode CE, and the undesirable lateral electric field is not generated between the pixels that are adjacent to each other with the black matrix BM interposed therebetween, whereby the liquid crystal molecule in the region overlapping the black matrix BM is maintained in the initial alignment state like the liquid crystal molecule while off (or during the black display). Accordingly, even if the color of the color filter varies in the pixels adjacent to each other, generation of a mixed color can be suppressed, and a decrease in color reproducibility and a decrease in contrast ratio can be suppressed.

When a deviation is generated in position adjustment between the array substrate AR and the countersubstrate CT, sometimes a difference is generated in the horizontal interelectrode distance between the pixel electrode PE and each of the common electrodes CE on both sides of the pixel electrode PE. However, because the deviation of the position adjustment is commonly generated in all the pixels PX, the electric field distribution is uniformed among the pixels PX, and the deviation of the position adjustment has a little influence on the image display. Additionally the undesirable leakage of the electric field to the adjacent pixel can be suppressed even if the deviation of the position adjustment is generated between the array substrate AR and the countersubstrate CT. Therefore, even if the color of the color filter varies in the pixels adjacent to each other, the generation of the mixed color can be suppressed, and the decrease in color reproducibility and the decrease in contrast ratio can be suppressed.

According to the embodiment, the primary common electrode CA is opposite to the source line S. Particularly, in the case that primary common electrode CAL and primary common electrode CAR are disposed immediately above source line S1 and source line S2, the aperture AP can be enlarged to improve the transmittance of the pixel PX compared with the case that primary common electrode CAL and primary common electrode CAR are disposed on the side of the pixel electrode PE beyond source line S1 and source line S2.

Primary common electrode CAL and primary common electrode CAR are disposed immediately above source line S1 and source line S2, which allows the inter-electrode distance between the pixel electrode PE and each of primary common electrodes CAL and CAR to be enlarged to form the lateral electric field closer to the horizontal direction. Therefore, the wide view angle that is of an advantage of the IPS mode of the background art can be maintained.

According to the embodiment, the plural domains can be formed in one pixel. Therefore, the view angle can optically be compensated in the plural directions, and the wide view angle can be obtained.

In the embodiment, because the liquid crystal layer LQ has the positive dielectric anisotropy, the initial alignment direction of the liquid crystal molecule LM is parallel to the Y-axis. Alternatively, as illustrated in FIG. 2, the initial alignment direction of the liquid crystal molecule LM may be an oblique direction D that obliquely intersects the Y-axis. At this point, an angle θ1 formed between the initial alignment direction D and the Y-axis is greater than 0° and less than 45°. From the viewpoint of the alignment control of the liquid crystal molecule LM, the angle θ1 ranges from about 5° to about 30°, desirably less than or equal to 20°. That is, desirably the initial alignment direction of the liquid crystal molecule LM is substantially parallel to directions of 0 to 20° with respect to the Y-axis.

In other words, desirably the first alignment film AL1 is formed such that the liquid crystal molecule LM in the vicinity of the first alignment film AL1 is initially aligned in the Y-axis or the direction oblique by 20° or less with respect to the Y-axis. Similarly, the second alignment film AL2 is formed such that the liquid crystal molecule LM in the vicinity of the second alignment film AL2 is initially aligned in the Y-axis or the direction oblique by 20° or less with respect to the Y-axis.

While on, because the lateral electric field is hardly formed on the pixel electrode PE or the common electrode CE (or the electric field enough to drive the liquid crystal molecule LM is not formed), the liquid crystal molecule LM moves hardly from the initial alignment direction like the state while off. Therefore, even if the pixel electrode PE and the common electrode CE are made of optically-transparent conductive materials, such as ITO, the light incident from the backlight unit 4 is hardly transmitted through the region, but the light hardly contributes to the display while on. Accordingly, it is not always necessary that the pixel electrode PE and the common electrode CE be made of transparent conductive materials, but the pixel electrode PE and the common electrode CE may be made of conductive materials, such as aluminum, silver, and copper.

In the embodiment, in addition to the primary common electrode CA provided in the countersubstrate CT, the common electrode CE may include a second primary common electrode (shield electrode), which is provided in the array substrate AR and is opposite to the primary common electrode CA (or opposite to the source line S). The second primary common electrode extends substantially parallel to the primary common electrode CA, and has the same potential as the primary common electrode CA. The undesirable electric field can be shielded from the source line S by providing the second primary common electrode.

In addition to the primary common electrode CA provided in the countersubstrate CT, the common electrode CE may include a second secondary common electrode (shield electrode), which is provided in the array substrate AR and is opposite to the gate line G and the auxiliary capacitance line C. The second secondary common electrode extends in the direction intersecting the primary common electrode CA, and has the same potential as the primary common electrode CA. The undesirable electric field can be shielded from the gate line G and the auxiliary capacitance line C by providing the second secondary common electrode. The configuration in which the second primary common electrode and the second secondary common electrode are provided can further suppress the degradation of the display quality.

Figure 5:
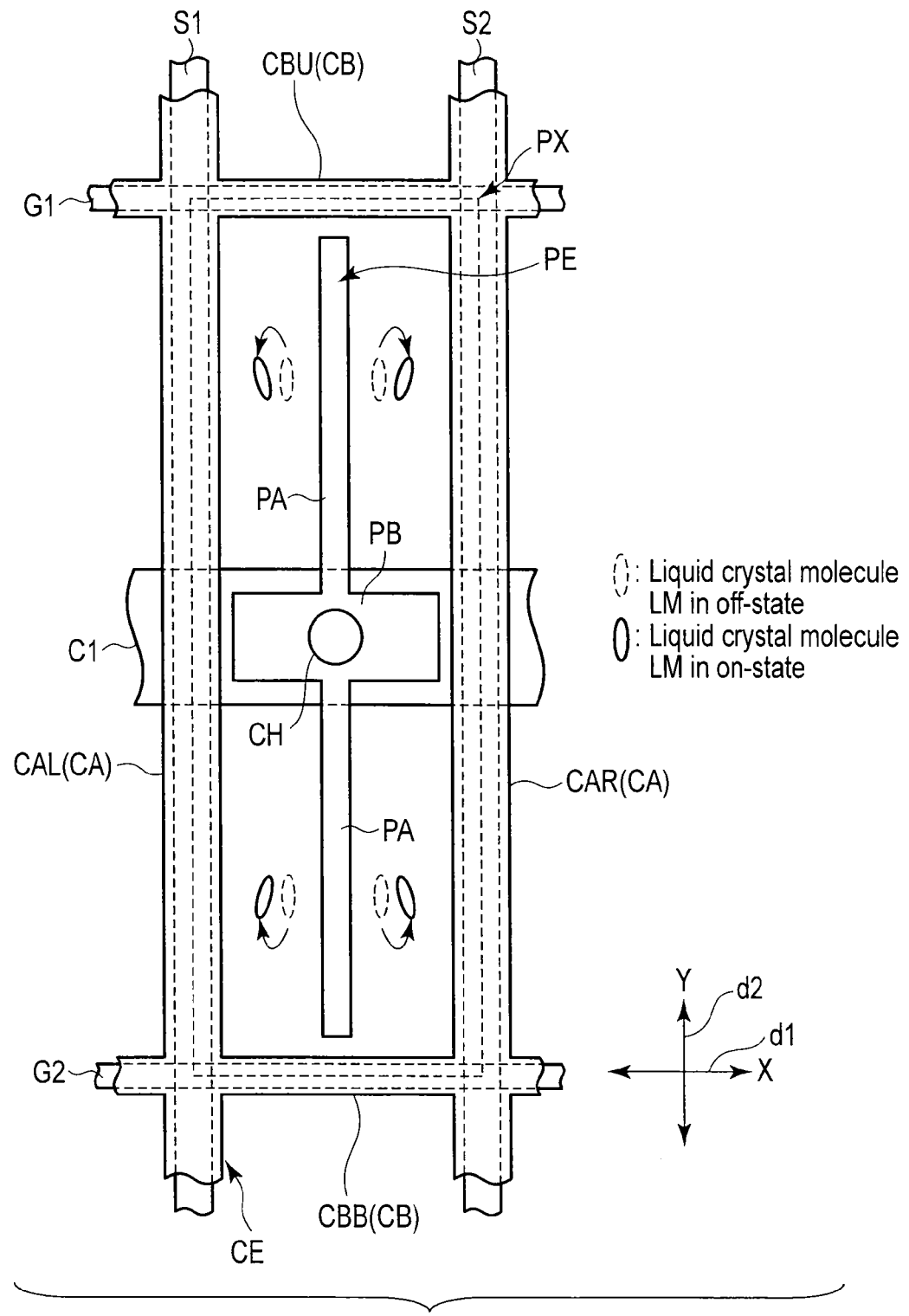
FIG. 5 is a plan view schematically illustrating a structural example of one pixel when a liquid crystal display panel according to a modification of the embodiment is viewed from the countersubstrate side.

A liquid crystal display panel of a modification according to the embodiment will be described below. FIG. 5 is a plan view schematically illustrating a structural example of one pixel PX when a liquid crystal display panel LPN of a modification according to the embodiment is viewed from a countersubstrate side CT.

As illustrated in FIG. 5, a common electrode CE further includes plural secondary common electrodes CB. In the modification, the secondary common electrodes CB are provided on the side of the countersubstrate CT. The secondary common electrodes CB are arrayed at predetermined intervals in the second direction d2, and plural primary pixel electrodes PA are interposed between the secondary common electrodes CB in the second direction d2. The secondary common electrodes CB extend in the first direction d1.

The secondary common electrodes CB are formed while being integral with plural primary common electrodes CA, or the secondary common electrodes CB and the primary common electrodes CA are continuously formed. Therefore, the secondary common electrodes CB (CBU and CBB) are electrically connected to the primary common electrodes CA. The voltage (common voltage) is provided from a power feeding portion VS to the primary common electrodes CA and the secondary common electrodes CB.

The liquid crystal display panel LPN of the modification differs from the liquid crystal display panel LPN of the embodiment in FIG. 2 in that a pixel electrode PE is formed into a cross shape and that the common electrode CE is formed into a lattice shape so as to surround one pixel PX. That is, the pixel electrode PE includes the primary pixel electrode PA and a secondary pixel electrode PB, which are electrically connected to each other. The primary pixel electrode PA extends linearly along the second direction d2 from the secondary pixel electrode PB to neighborhoods of the upper and lower end portions of the pixel PX. The secondary pixel electrode PB extends in the first direction d1. The secondary pixel electrode PB is located in the region opposing an auxiliary capacitance line C1, and electrically connected to a switching element through a contact hole CH. In FIG. 5, the secondary pixel electrode PB is provided in the substantial center of the pixel PX, and a pixel electrode PE is formed into a cross shape.

The secondary common electrode CB is opposite to a gate line G. In FIG. 5, the two secondary common electrodes CB are parallel to each other along the first direction d1, and disposed at right and left end portions of the pixel PX. Hereinafter, in order to distinguish the secondary common electrodes CB, the secondary common electrode on the upper side in FIG. 5 is designated by CBU, and the secondary common electrode on the lower side is designated by CBB. Secondary common electrode CBU is disposed in the upper end portion of the pixel PX, and is opposite to a gate line G1. That is, secondary common electrode CBU is disposed while striding across the boundary between the pixel PX and the pixel adjacent to the pixel PX on the upper side. Secondary common electrode CBB is disposed in the lower end portion of the pixel PX, and is opposite to a gate line G2. That is, secondary common electrode CBB is disposed while striding across the boundary between the pixel PX and the pixel adjacent to the pixel PX on the lower side.

When attention is focused on the positional relationship between the pixel electrode PE and the common electrode CE, the primary pixel electrodes PA and the primary common electrodes CA are alternately disposed in the first direction d1, and the secondary pixel electrodes PB and the secondary common electrodes CB are alternately disposed in the second direction d2. That is, one primary pixel electrode PA is located between a primary common electrode CAL and a primary common electrode CAR, which are adjacent to each other, and primary common electrode CAL, the primary pixel electrode PA, and primary common electrode CAR are arrayed in order along the first direction d1. One secondary pixel electrode PB is located between secondary common electrode CBB and secondary common electrode CBU, which are adjacent to each other, and secondary common electrode CBB, the secondary pixel electrode PB, and secondary common electrode CBU are arrayed in order along the second direction d2.

According to the structural example of the modification, the liquid crystal molecule LM initially aligned in the Y-axis while off is affected by the electric field formed between the pixel electrode PE and the common electrode CE while on, and the long axis of the liquid crystal molecule LM rotates in the plane substantially parallel to the X-Y plane as illustrated by the continuous line in FIG. 5. The liquid crystal molecule LM located in the region surrounded by the pixel electrode PE, primary common electrode CAL, and secondary common electrode CBB rotates clockwise with respect to the Y-axis, and is aligned toward the lower left direction in FIG. 5. The liquid crystal molecule LM located in the region surrounded by the pixel electrode PE, primary common electrode CAR, and secondary common electrode CBB rotates counterclockwise with respect to the Y-axis, and is aligned toward the lower right direction in FIG. 5. The liquid crystal molecule LM located in the region surrounded by the pixel electrode PE, primary common electrode CAL, and secondary common electrode CBU rotates counterclockwise with respect to the Y-axis, and is aligned toward the upper left direction in FIG. 5. The liquid crystal molecule LM located in the region surrounded by the pixel electrode PE, primary common electrode CAR, and secondary common electrode CBU rotates clockwise with respect to the Y-axis, and is aligned toward the upper right direction in FIG. 5.

In each pixel PX, while the electric field is formed between the pixel electrode PE and the common electrode CE, because the electric fields different from one another act on the four domains, not only the view angle can be widened, but also an alignment regulating force of the liquid crystal molecule LM can be strengthened compared with the pixel structure in FIG. 2.

As described above, the configuration of the liquid crystal display device is described in order to adopt the lateral electric field mode or the oblique electric field mode, which is different from the IPS mode and the FFS mode. Liquid crystal display devices of Examples 1 to 4, in which the lateral electric field mode or the oblique electric field mode, which is different from the IPS mode and the FFS mode, is adopted, a view angle property of the black luminance is good, and the display quality is excellent, will be described below. Liquid crystal display device of Comparative Examples 1 and 2 will also be described.

The following Example are described, but not limited to, only by way of example. That is, the liquid crystal display device of the embodiment is not limited to Examples 1 to 4, but various modifications can be made.

EXAMPLE 1

FIG. 6 is an exploded perspective view partially illustrating a liquid crystal display panel LPN of Example 1 according to the embodiment, and is a view schematically illustrating the liquid crystal layer LQ, the polarizer, and the retardation film. Only the point necessary for the description is illustrated in FIG. 6.

As illustrated in FIGS. 6 and 3, the liquid crystal display device further includes a first retardation film 30 and a second retardation film 40. In Example 1, the second optical element OD2 further includes the first retardation film 30 and the second retardation film 40 in addition to the second polarizer PL2.

The first retardation film 30 is disposed between the countersubstrate CT and the second polarizer PL2. The first retardation film 30 is disposed such that a first slow axis SA1 of the first retardation film 30 is parallel to the Y-axis. The second retardation film 40 is located on the opposite side to the liquid crystal layer LQ with respect to the first retardation film 30, and stacked on the first retardation film 30. The second retardation film 40 is disposed such that a second slow axis SA2 of the second retardation film 40 is parallel to the Y-axis.

At this point, properties of the first retardation film 30, particularly optical properties are defined as follows.

$nx1$: refractive index in X-axis direction
$ny1$: refractive index in Y-axis direction
$nz1$: refractive index in Z-axis direction orthogonal to X- and Y-axis directions (parallel to third direction d3)
$d1$: thickness
$Re1=(nx1-ny1)\cdot d1$: horizontal retardation value defined by X-axis and Y-axis
$Rth1 =((nx1+ny1)/2-nz1)\cdot d1$: vertical retardation value along Z-axis The properties of the second retardation film 40, particularly optical properties are defined as follows.

$nx2$: refractive index in X-axis direction
$ny2$: refractive index in Y-axis direction
$nz2$: refractive index in Z-axis direction
$d2$: thickness
$Re2=(nx2-ny2)\cdot d2$: horizontal retardation value
$Rth2=((nx2+ny2)/2-nz2)\cdot d2$: vertical retardation value The optical properties in the total of the first retardation film 30 and the second retardation film 40 are defined as follows.

$Re(sum)$: sum $(Re1+Re2)$ of horizontal retardation value of first retardation film 30 and horizontal retardation value of second retardation film 40

$Rth(sum)$: sum $(Rth1 +Rth2)$ of vertical retardation value of first retardation film 30 and vertical retardation value of second retardation film 40

Therefore, the first retardation film 30 and the second retardation film 40 of Example 1 are adjusted such that the following values are obtained for the light having a wavelength of 550 nm.

Figure 8:
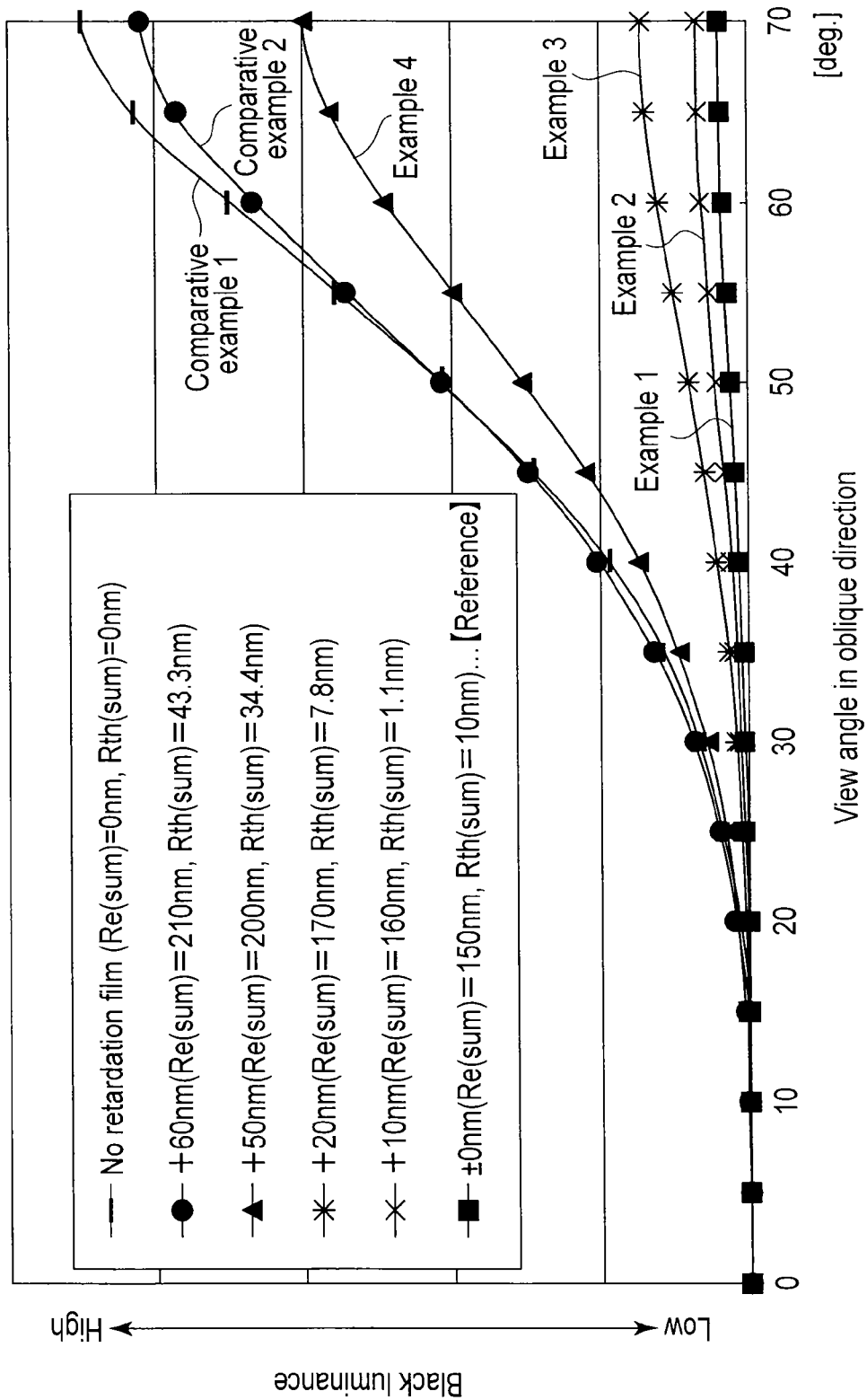
FIG. 8 is a graph illustrating a change in black luminance with respect to a view angle in an oblique direction in liquid crystal display devices of Examples 1 to 4 of the embodiment and liquid crystal display devices of Comparative Examples 1 and 2.

$Re1=60$ nm
$Re2=90$ nm
$Re1<Re2$
$Rth1=-90$ nm
$Rth2=80$ nm
$Re(sum)=150\pm0$ nm
$Rth(sum)=-10\pm0$ nm FIGS. 7 and 8 illustrate results investigated by the inventors. FIG. 7 is a distribution chart of the black luminance of the liquid crystal display device of Example 1. FIG. 8 is a graph illustrating a change in black luminance with respect to the view angle in the oblique direction (direction rotates counterclockwise by 45°) in the liquid crystal display devices of Examples 1 to 4 and Comparative Examples 1 and 2. In FIG. 8, in addition to 45°, the same holds true for 135, 225, and 315°.

As illustrated in FIGS. 7 and 8, in the liquid crystal display device of Example 1, it is found that the black luminance (a luminance level during the black display) is low in the wide view angle. It is found that the low black luminance is obtained even in the oblique direction in which the black luminance is most easily enhanced.

EXAMPLE 2

The first retardation film 30 and the second retardation film 40 of Example 2 are adjusted such that the following values are obtained for the light having the wavelength of 550 nm.

$Re1<Re2$
$Re(sum)=150+10$ nm
$Rth(sum)=-10+8.9$ nm

Except the above configuration, the liquid crystal display device of Example 2 is identical to the liquid crystal display device of Example 1.

The investigation performed by the inventors shows that the black luminance is low in the wide view angle even in the liquid crystal display device of Example 2. As illustrated in FIG. 8, it is found that the low black luminance is obtained even in the oblique direction in which the black luminance is most easily enhanced.

EXAMPLE 3

The first retardation film 30 and the second retardation film 40 of Example 3 are adjusted such that the following values are obtained for the light having the wavelength of 550 nm.

$Re1<Re2$
$Re(sum)=150+20$ nm
$Rth(sum)=-10+17.8$ nm

Except the above configuration, the liquid crystal display device of Example 3 is identical to the liquid crystal display device of Example 1.

The investigation performed by the inventors shows that the black luminance is low in the wide view angle even in the liquid crystal display device of Example 3. As illustrated in FIG. 8, it is found that the low black luminance is obtained even in the oblique direction in which the black luminance is most easily enhanced.

EXAMPLE 4

The first retardation film 30 and the second retardation film 40 of Example 4 are adjusted such that the following values are obtained for the light having the wavelength of 550 nm.

$Re1<Re2$
$Re(sum)=150+50$ nm
$Rth(sum)=-10+44.4$ nm

Except the above configuration, the liquid crystal display device of Example 4 is identical to the liquid crystal display device of Example 1.

The investigation performed by the inventors shows that the black luminance is low in the wide view angle even in the liquid crystal display device of Example 4. As illustrated in FIG. 8, it is found that the sufficiently low black luminance is obtained even in the oblique direction in which the black luminance is most easily enhanced.

COMPARATIVE EXAMPLE 1

The liquid crystal display device of the Comparative Example 1 is formed without providing the first retardation film 30 and the second retardation film 40. Therefore, Re(sum) and Rth(sum) are obtained as follows.

$Re(sum)=0$ nm
$Rth(sum)=0$ nm

Except the above configuration, the liquid crystal display device of Comparative Example 1 is identical to the liquid crystal display device of Example 1.

FIG. 9 illustrates a result investigated by the inventors. FIG. 9 is a distribution chart of the black luminance of the liquid crystal display device of Comparative Example 1.

As illustrated in FIGS. 8 and 9, in the liquid crystal display device of Comparative Example 1, it is found that the black luminance is low in wide view angles in the vertical direction and the horizontal direction. However, the high black luminance was obtained in the oblique direction.

COMPARATIVE EXAMPLE 2

The first retardation film 30 and the second retardation film 40 of Comparative Example 2 are adjusted such that the following values are obtained for the light having the wavelength of 550 nm.

Re1<Re2
Re(sum)=150+60 nm
Rth(sum)=−10+53.3 nm

Except the above configuration, the liquid crystal display device of Comparative Example 2 is identical to the liquid crystal display device of Example 1.

FIG. 10 illustrates a result investigated by the inventors. FIG. 10 is a distribution chart of the black luminance of the liquid crystal display device of Comparative Example 2.

As illustrated in FIGS. 8 and 10, in the liquid crystal display device of Comparative Example 2, it is found that the black luminance is low in wide view angles in the vertical direction and the horizontal direction. However, the high black luminance is obtained in the oblique direction. That is, the result in which the black luminance is higher than that of Comparative Example 1 is obtained in the view angle range of 15 to 50°. In other words, in the case that the retardation values of the first retardation film 30 and the second retardation film 40 are not properly adjusted but the first retardation film 30 and the second retardation film 40 are simply disposed, the result in FIG. 8 shows that the decrease in black luminance is not generated in a partial or whole range of the view angle compared with the liquid crystal display device in which the retardation film is not used.

Accordingly, in the liquid crystal display device of the embodiment having the above configuration, the lateral electric field mode or the oblique electric field mode, which is different from the IPS mode and the FFS mode, can be adopted.

The properties (optical properties) of the first retardation film 30 and the second retardation film 40 are adjusted like Examples 1 to 4. Therefore, the black luminance can be decreased in the whole range of the view angle in the oblique direction compared with Comparative Example 1.

The inventors also investigated liquid crystal display devices except the liquid crystal display devices of Examples 1 to 4 and Comparative Examples 1 and 2. As a result, when the first retardation film 30 and the second retardation film 40 are adjusted as follows, the black luminance can be decreased in the view angle in the oblique direction compared with Comparative Example 1.
Re1<Re2
Re(sum)=150±50 nm
Rth(sum)=−10±50 nm Therefore, the liquid crystal display device having the good black luminance property and the excellent display quality can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the first retardation film 30 and the second retardation film 40 may be provided on the side of the array substrate AR.

Figure 11:
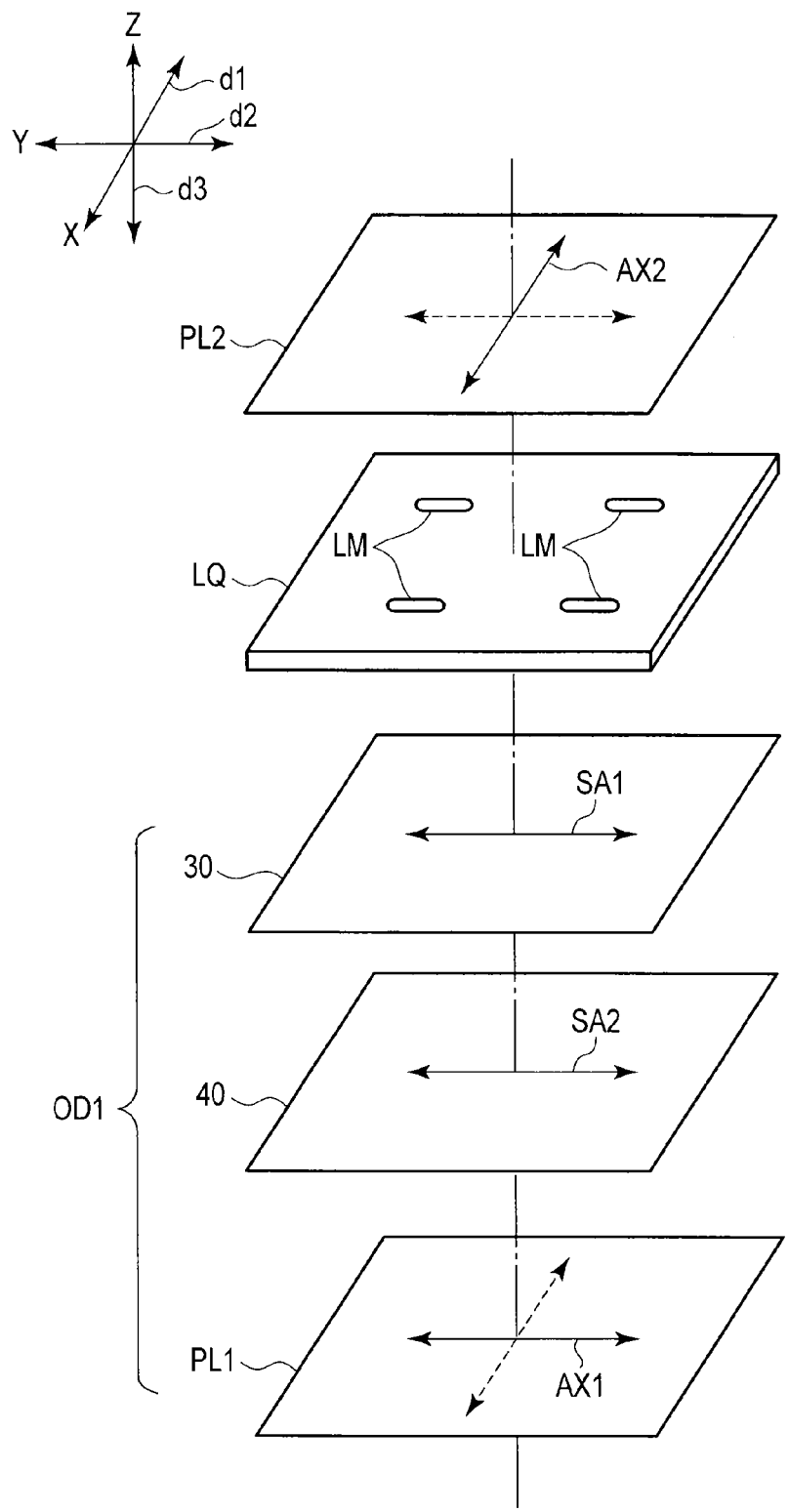
FIG. 11 is an exploded perspective view partially illustrating a liquid crystal display panel of another modification according to the embodiment, and is a view schematically illustrating a liquid crystal layer, a polarizer, and a retardation film.

FIG. 11 is an exploded perspective view partially illustrating a liquid crystal display panel LPN of another modification according to the embodiment, and is a view schematically illustrating a liquid crystal layer LQ, a polarizer, and a retardation film. Only the point necessary for the description is illustrated in FIG. 11.

As illustrated in FIG. 11, a first retardation film 30 is disposed between an array substrate AR and a first polarizer PL1. A second retardation film 40 is located on the opposite side to a liquid crystal layer LQ with respect to the first retardation film 30, and stacked on the first retardation film 30.

Even if the first retardation film 30 and the second retardation film 40 are disposed as described above, the same effect as the embodiment can be obtained by adjusting Re1, Re2, Re(sum), and Rth(sum) within the same ranges as the embodiment.

The liquid crystal layer LQ may have negative dielectric anisotropy, namely, the liquid crystal layer LQ may be made of an n-type liquid crystal.

FIG. 12 is an exploded perspective view partially illustrating a liquid crystal display panel LPN of still another modification according to the embodiment, and is a view schematically illustrating a liquid crystal layer, a polarizer, and a retardation film.

Only the point necessary for the description is illustrated in FIG. 12.

As illustrated in FIG. 12, the liquid crystal layer LQ is made of an n-type liquid crystal. The Y-axis is parallel to the first direction d1, and the X-axis is parallel to the second direction d2. Therefore, the direction in which the liquid crystal molecule LM is initially aligned is substantially parallel to the first direction d1, the first retardation film 30 is disposed such that first slow axis SA1 is parallel to the first direction d1, and a second retardation film 40 is disposed such that the second slow axis SA2 is parallel to the first direction d1.

Even if the liquid crystal layer LQ is made of the n-type liquid crystal as described above, the same effect as the embodiment can be obtained by adjusting Re1, Re2, Re(sum), and Rth(sum) within the same ranges as the embodiment.

The first retardation film 30 and the second retardation film 40 may be provided on the side of the array substrate AR, and the liquid crystal layer LQ may be made of an n-type liquid crystal.

Figure 13:
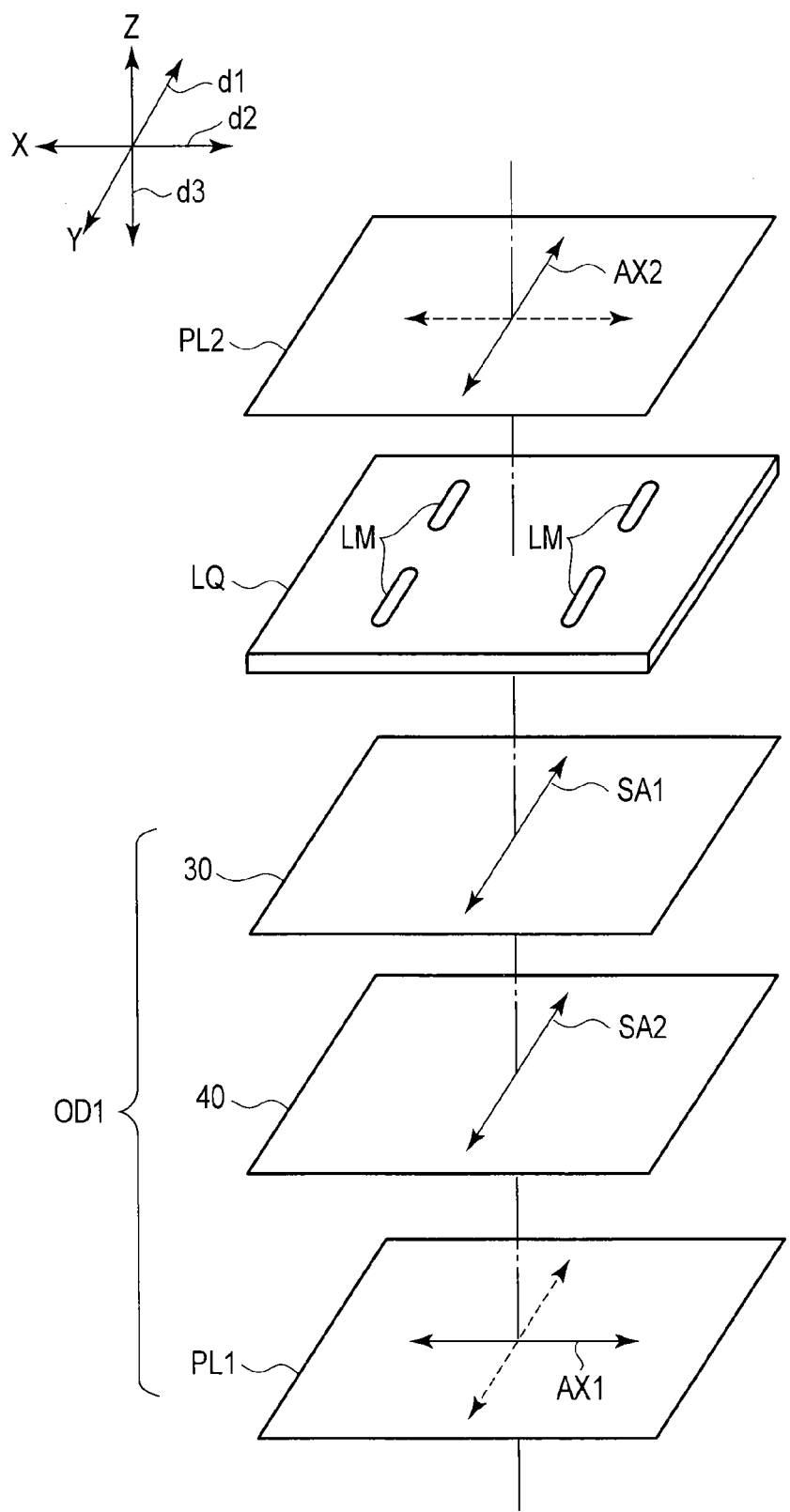
FIG. 13 is an exploded perspective view partially illustrating a liquid crystal display panel of yet another modification according to the embodiment, and is a view schematically illustrating a liquid crystal layer, a polarizer, and a retardation film.

FIG. 13 is an exploded perspective view partially illustrating a liquid crystal display panel LPN of yet another modification according to the embodiment, and is a view schematically illustrating a liquid crystal layer LQ, a polarizer, and a retardation film. Only the point necessary for the description is illustrated in FIG. 13.

As illustrated in FIG. 13, a first retardation film 30 is disposed between an array substrate AR and a first polarizer PL1. A second retardation film 40 is located on the opposite side to a liquid crystal layer LQ with respect to the first retardation film 30, and stacked on the first retardation film 30. The liquid crystal layer LQ is made of an n-type liquid crystal. The Y-axis is parallel to the first direction d1, and the X-axis is parallel to the second direction d2.

Even if the liquid crystal layer LQ is made of the n-type liquid crystal while the first retardation film 30 and the second retardation film 40 are disposed as described above, the same effect as the embodiment can be obtained by adjusting Re1, Re2, Re(sum), and Rth(sum) within the same ranges as the embodiment.

In the embodiment, the structure of the pixel PX is not limited to the examples in FIGS. 2 and 5, but various modifications can be made. For example, even if the pixel PX is configured as illustrated in FIG. 14, the same effect as the embodiment can be obtained.

FIG. 14 is a plan view schematically illustrating another structural example of one pixel PX when the liquid crystal display panel LPN in FIG. 1 is viewed from the countersubstrate side.

As illustrated in FIG. 14, the pixel PX differs from the pixel in FIG. 5 in a pixel electrode PE. The pixel electrode PE includes a primary pixel electrode PA and a secondary pixel electrode PD. The primary pixel electrode PA and the secondary pixel electrode PD are electrically connected to each other. In the embodiment, the whole pixel electrode PE is provided in the array substrate AR.

A longitudinal direction of the primary pixel electrode PA is the second direction d2. The secondary pixel electrode PD extends in the first direction d1. More specifically, the primary pixel electrode PA is formed into a belt shape that extends linearly along the second direction d2 in the substantial center of the pixel. The secondary pixel electrode PD is formed into a belt shape that extends linearly along the first direction d1 in the upper end portion of the pixel PX. The secondary pixel electrode PD may be disposed between the upper and lower pixels. That is, the secondary pixel electrode PD may be disposed while striding across the boundary between the pixel PX in FIG. 14 and a pixel (not illustrated) above the pixel PX in FIG. 14.

The secondary pixel electrode PD is coupled to one end portion of the primary pixel electrode PA, and extends from the primary pixel electrode PA toward both sides of the primary pixel electrode PA. The secondary pixel electrode PD is substantially orthogonal to the primary pixel electrode PA. The secondary pixel electrode PD may be coupled to a portion closer to the other end portion than one end portion of the primary pixel electrode PA. For example, the pixel electrode PE is electrically connected to a switching element (not illustrated) in the secondary pixel electrode PD. In FIG. 14, the pixel electrode PE is formed into a T-shape.

In the pixel PX having the above configuration, the right side of the pixel PX has two domains (corresponding to the upper-right and lower-left domains in FIG. 5), and the left side of the pixel PX has two domains (corresponding to the upper-left and lower-right domains in FIG. 5).

The liquid crystal layer LQ is made of an n-type liquid crystal. In each pixel PX, while the electric field is formed between the pixel electrode PE and the common electrode CE, the more domains can be formed compared with the pixel in FIG. 2, the view angle can be widened, and the alignment regulating force of the liquid crystal molecule can be strengthened compared with the pixel in FIG. 2. In the configuration of the pixel PX in FIG. 12, the liquid crystal layer LQ may be made of a p-type liquid crystal. In this case, the stronger the alignment regulating force of the liquid crystal molecule can be obtained.

What is claimed is:

1. A liquid crystal display device comprising:
   a first substrate;
   a second substrate arranged opposite to the first substrate with a gap;
   a liquid crystal layer held between the first substrate and the second substrate, a liquid crystal molecule in the liquid crystal layer being initially aligned in a direction substantially parallel to a Y-axis;
   a plurality of pixels provided in a two-dimensional matrix in a first direction and a second direction orthogonal to the first direction, a length in the first direction being less than a length in the second direction in each of the pixels;
   a plurality of source lines provided on the first substrate and extending in the second direction;
   a plurality of gate lines provided on the first substrate and extending in the first direction;
   a black matrix disposed in an inner surface opposite the first substrate of the second substrate and comprising a plurality of portions extending in the second direction and opposed to the source lines, respectively;
   a first polarizer disposed in an outer surface of the first substrate and having a first absorption axis parallel to the Y-axis;
   a second polarizer disposed in an outer surface of the second substrate and having a second absorption axis parallel to an X-axis orthogonal to the Y-axis, the first polarizer and the second polarizer being disposed at a crossed nicols angle;
   a first retardation film disposed between the second substrate and the second polarizer and having a first slow axis parallel to the Y-axis; and
   a second retardation film disposed between the first retardation film and the second polarizer and having a second slow axis parallel to the Y-axis, wherein
   the X-axis is parallel to the first direction,
   the Y-axis is parallel to the second direction,
   each of the pixels comprises a primary pixel electrode that is provided on the first substrate and extends in the second direction, a pair of primary common electrodes that is provided on the second substrate, is separated from each other in the first direction and extends in the second direction, and a pair of secondary common electrodes that is provided on the second substrate and extends in the first direction, the primary pixel electrode being interposed between the primary common electrodes in the first direction,
   one of the primary common electrodes is disposed opposite to one of the source lines and one of the portions in the black matrix, and has a width less than or equal to a width of the one of the portions in the first direction,
   the other of the primary common electrodes is disposed opposite to another source line adjacent to the one of the source lines and another portion adjacent to the one of the portions in the black matrix, and has a width less than or equal to a width of another portion in the first direction,
   one of the secondary common electrodes is disposed opposite to one of the gate lines,
   the other of the secondary common electrodes is disposed opposite to another gate line adjacent to the one of the gate lines,
   assuming that nx1 is a refractive index in the X-axis, that ny1 is a refractive index in
   the Y-axis, that nz1 is a refractive index in a Z-axis orthogonal to the X-axis and the Y-axis, that d1 is a thickness, that Re1=(nx1−ny1)·d1 is a horizontal retardation defined by the X-axis and the Y-axis, and that Rth1=((nx1+ny1)/2−nz1)·d1 is a vertical retardation along the Z-axis in the first retardation film,
   assuming that nx2 is a refractive index in the X-axis, that ny2 is a refractive index in the Y-axis, that nz2 is a refractive index in the Z-axis, that d2 is a thickness, that Re2=(nx2−ny2)·d2 is a horizontal retardation value, and that Rth2=((nx2+ny2)/2−nz2)·d2 is a vertical retardation value in the second retardation film,
   Re1<Re2 holds,
   Re1+Re2=150±20 nm holds for light having a wavelength of 550 nm, and
   Rth1+Rth2=−10±17.8 nm holds for the light having the wavelength of 550 nm.

2. The liquid crystal display device according to claim 1, wherein the liquid crystal layer has a positive dielectric anisotropy, the first substrate further comprises a first alignment film that initially aligns the liquid crystal molecule in the second direction or a direction that is oblique to the second direction by 20° or less, and the second substrate further comprises a second alignment film that initially aligns the liquid crystal molecule in the second direction or a direction that is oblique to the second direction by 20° or less.

3. The liquid crystal display device according to claim 1, wherein each of the pixels further comprises a secondary pixel electrode, which is provided on the first substrate, connected to the primary pixel electrode, and extends in the first direction, and
the secondary pixel electrode is interposed between the secondary common electrodes in the second direction.

4. The liquid crystal display device according to claim 3, wherein the primary pixel electrode and the secondary pixel electrode intersect each other, and are formed into a cross shape.

5. The liquid crystal display device according to claim 3, wherein the secondary pixel electrode is coupled to one end portion of the primary pixel electrode, and the primary pixel electrode and the secondary pixel electrode are formed into a T-shape.

6. The liquid crystal display device according to claim 3, wherein the liquid crystal layer has a negative dielectric anisotropy, the first substrate further comprises a first alignment film that initially aligns the liquid crystal molecule in the second direction or a direction that is oblique to the second direction by 20° or less, and the second substrate further comprises a second alignment film that initially aligns the liquid crystal molecule in the second direction or a direction that is oblique to the second direction by 20° or less.

7. The liquid crystal display device according to claim 1, wherein
a distance between the primary pixel electrode and each of the primary common electrodes is greater than or equal to double a cell gap of the liquid crystal layer.

8. The liquid crystal display device according to claim 1, further comprising:
an auxiliary capacitance line disposed in a substantially central portion of the pixel, and extending in the first direction, and
a switching element electrically connected to the one of the gate lines and the one of the source lines, provided at an intersection of the one of the gate lines and the one of the source lines, and comprising a drain line,
wherein
the drain line is extended along the one of the source lines and the auxiliary capacitance line, and electrically connected to the pixel electrode through a contact hole that is made in a region overlapping the auxiliary capacitance line.

9. A liquid crystal display device comprising:
a first substrate;
a second substrate arranged opposite to the first substrate with a gap;
a liquid crystal layer held between the first substrate and the second substrate, a liquid crystal molecule in the liquid crystal layer being initially aligned in a direction substantially parallel to a Y-axis;
a plurality of pixels provided in a two-dimensional matrix in a first direction and a second direction orthogonal to the first direction, a length in the first direction being less than a length in the second direction in each of the pixels;
a plurality of source lines provided on the first substrate and extending in the second direction;
a plurality of gate lines provided on the first substrate and extending in the first direction;
a black matrix disposed in an inner surface opposite the first substrate of the second substrate and comprising a plurality of portions extending in the second direction and opposed to the source lines, respectively;
a first polarizer disposed in an outer surface of the first substrate and having a first absorption axis parallel to the Y-axis;
a second polarizer disposed in an outer surface of the second substrate and having a second absorption axis parallel to an X-axis orthogonal to the Y-axis, the first polarizer and the second polarizer being disposed at a crossed nicols angle;
a first retardation film disposed between the first substrate and the first polarizer and having a first slow axis parallel to the Y-axis; and
a second retardation film disposed between the first retardation film and the first polarizer and having a second slow axis parallel to the Y-axis, wherein
the X-axis is parallel to the first direction,
the Y-axis is parallel to the second direction,
each of the pixels comprises a primary pixel electrode that is provided on the first substrate and extends in the second direction, a pair of primary common electrodes that is provided on the second substrate, is separated from each other in the first direction and extends in the second direction, and a pair of secondary common electrodes that is provided on the second substrate and extends in the first direction, the primary pixel electrode being interposed between the primary common electrodes in the first direction,
one of the primary common electrodes is disposed opposite to one of the source lines and one of the portions in the black matrix, and has a width less than or equal to a width of the one of the portions in the first direction,
the other of the primary common electrodes is disposed opposite to another source line adjacent to the one of the source lines and another portion adjacent to the one of the portions in the black matrix, and has a width less than or equal to a width of another portion in the first direction,
one of the secondary common electrodes is disposed opposite to one of the gate lines,
the other of the secondary common electrodes is disposed opposite to another gate line adjacent to the one of the gate lines,
assuming that $nx1$ is a refractive index in the X-axis, that $ny1$ is a refractive index in the Y-axis, that $nz1$ is a refractive index in a Z-axis orthogonal to the X-axis and the Y-axis, that $d1$ is a thickness, that $Re1=(nx1-ny1)\cdot d1$ is a horizontal retardation defined by the X-axis and the Y-axis, and that $Rth1=((nx1+ny1)/2-nz1)\cdot d1$ is a vertical retardation along the Z-axis in the first retardation film,
assuming that $nx2$ is a refractive index in the X-axis, that $ny2$ is a refractive index in the Y-axis, that $nz2$ is a refractive index in the Z-axis, that $d2$ is a thickness, that $Re2=(nx2-ny2)\cdot d2$ is a horizontal retardation value, and that $Rth2=((nx2+ny2)/2-nz2)\cdot d2$ is a vertical retardation value in the second retardation film,
$Re1<Re2$ holds,
$Re1+Re2=150\pm20$ nm holds for light having a wavelength of 550 nm, and Rth1+Rth2=−10+17.8 nm holds for the light having the wavelength of 550 nm.

10. A liquid crystal display device comprising:
a first substrate;
a second substrate arranged opposite to the first substrate with a gap;
a liquid crystal layer held between the first substrate and the second substrate, a liquid crystal molecule in the liquid crystal layer being initially aligned in a direction substantially parallel to a Y-axis;
a plurality of pixels provided in a two-dimensional matrix in a first direction and a second direction orthogonal to the first direction, a length in the first direction being less than a length in the second direction in each of the pixels;
a plurality of source lines provided on the first substrate and extending in the second direction;
a plurality of gate lines provided on the first substrate and extending in the first direction;
a black matrix disposed in an inner surface opposite the first substrate of the second substrate and comprising a plurality of portions extending in the second direction and opposed to the source lines respectively;
a first polarizer disposed in an outer surface of the first substrate and having a first absorption axis parallel to an X-axis orthogonal to the Y-axis;
a second polarizer disposed in an outer surface of the second substrate and having a second absorption axis parallel to the Y-axis, the first polarizer and the second polarizer being disposed at a crossed nicols angle;
a first retardation film disposed between the second substrate and the second polarizer and having a first slow axis parallel to the Y-axis; and
a second retardation film disposed between the first retardation film and the second polarizer and having a second slow axis parallel to the Y-axis, wherein
the X-axis is parallel to the second direction,
the Y-axis is parallel to the first direction,
each of the pixels comprises a primary pixel electrode that is provided on the first substrate and extends in the second direction, a pair of primary common electrodes that is provided on the second substrate, is separated from each other in the first direction and extends in the second direction, and a pair of secondary common electrodes that is provided on the second substrate and extends in the first direction, the primary pixel electrode being interposed between the primary common electrodes in the first direction,
one of the primary common electrodes is disposed opposite to one of the source lines and one of the portions in the black matrix, and has a width less than or equal to a width of the one of the portions in the first direction,
the other of the primary common electrodes is disposed opposite to another source line adjacent to the one of the source lines and another portion adjacent to the one of the portions in the black matrix, and has a width less than or equal to a width of another portion in the first direction,
one of the secondary common electrodes is disposed opposite to one of the gate lines,
the other of the secondary common electrodes is disposed opposite to another gate line adjacent to the one of the gate lines,
assuming that $nx1$ is a refractive index in the X-axis, that $ny1$ is a refractive index in the Y-axis, that $nz1$ is a refractive index in a Z-axis orthogonal to the X-axis and the Y-axis, that $d1$ is a thickness, that $Re1=(nx1-ny1)\cdot d1$ is a horizontal retardation defined by the X-axis and the Y-axis, and that $Rth1=((nx1+ny1)/2-nz1)\cdot d1$ is a vertical retardation along the Z-axis in the first retardation film,
assuming that $nx2$ is a refractive index in the X-axis, that $ny2$ is a refractive index in the Y-axis, that $nz2$ is a refractive index in the Z-axis, that $d2$ is a thickness, that $Re2=(nx2-ny2)\cdot d2$ is a horizontal retardation value, and that $Rth2=((nx2+ny2)/2-nz2)\cdot d2$ is a vertical retardation value in the second retardation film,
Re1<Re2 holds,
Re1+Re2=150+20 nm holds for light having a wavelength of 550 nm, and
Rth1+Rth2=−10±17.8 nm holds for the light having the wavelength of 550 nm.

11. A liquid crystal display device comprising:
a first substrate;
a second substrate arranged opposite to the first substrate with a gap;
a liquid crystal layer held between the first substrate and the second substrate, a liquid crystal molecule in the liquid crystal layer being initially aligned in a direction substantially parallel to a Y-axis;
a plurality of pixels provided in a two-dimensional matrix in a first direction and a second direction orthogonal to the first direction, a length in the first direction being less than a length in the second direction in each of the pixels;
a plurality of source lines provided on the first substrate and extending in the second direction;
a plurality of gate lines provided on the first substrate and extending in the first direction;
a black matrix disposed in an inner surface opposite the first substrate of the second substrate and comprising a plurality of portions extending in the second direction and opposed to the source lines respectively;
a first polarizer disposed in an outer surface of the first substrate and having a first absorption axis parallel to an X-axis orthogonal to the Y-axis;
a second polarizer disposed in an outer surface of the second substrate and having a second absorption axis parallel to the Y-axis, the first polarizer and the second polarizer being disposed at a crossed nicols angle;
a first retardation film disposed between the first substrate and the first polarizer and having a first slow axis parallel to the Y-axis; and
a second retardation film disposed between the first retardation film and the first polarizer and having a second slow axis parallel to the Y-axis, wherein
the X-axis is parallel to the second direction,
the Y-axis is parallel to the first direction,
each of the pixels comprises a primary pixel electrode that is provided on the first substrate and extends in the second direction, a pair of primary common electrodes that is provided on the second substrate, is separated from each other in the first direction and extends in the second direction, and a pair of secondary common electrodes that is provided on the second substrate and extends in the first direction, the primary pixel electrode being interposed between the primary common electrodes in the first direction,
one of the primary common electrodes is disposed opposite to one of the source lines and one of the portions in the black matrix, and has a width less than or equal to a width of the one of the portions in the first direction,
the other of the primary common electrodes is disposed opposite to another source line adjacent to the one of the source lines and another portion adjacent to the one of the portions in the black matrix, and has a width less than or equal to a width of another portion in the first direction, one of the secondary common electrodes is disposed opposite to one of the gate lines, the other of the secondary common electrodes is disposed opposite to another gate line adjacent to the one of the gate lines, assuming that $nx1$ is a refractive index in the X-axis, that $ny1$ is a refractive index in the Y-axis, that $nz1$ is a refractive index in a Z-axis orthogonal to the X-axis and the Y-axis, that $d1$ is a thickness, that $Re1=(nx1-ny1) \cdot d1$ is a horizontal retardation defined by the X-axis and the Y-axis, and that $Rth1=((nx1+ny1)/2-nz1) \cdot d1$ is a vertical retardation along the Z-axis in the first retardation film, assuming that $nx2$ is a refractive index in the X-axis, that $ny2$ is a refractive index in the Y-axis, that $nz2$ is a refractive index in the Z-axis, that $d2$ is a thickness, that $Re2=(nx2-ny2) \cdot d2$ is a horizontal retardation value, and that $Rth2=((nx2+ny2)/2-nz2) \cdot d2$ is a vertical retardation value in the second retardation film, $Re1 < Re2$ holds, $Re1+Re2=150 \pm 20$ nm holds for light having a wavelength of 550 nm, and $Rth1+Rth2=-10 \pm 17.8$ nm holds for the light having the wavelength of 550 nm.

\* \* \* \* \*